United States Patent [19]

Seeger et al.

[11] 4,041,208
[45] Aug. 9, 1977

[54] TRANSPARENT, IMPACT-RESISTANT POLYESTERURETHANE LAMINATES

[75] Inventors: Nelson V. Seeger, Cuyahoga Falls; Andrew J. Kaman, Norton, both of Ohio

[73] Assignee: PPG Industries, Inc., Pittsburgh, Pa.

[21] Appl. No.: 472,019

[22] Filed: May 21, 1974

Related U.S. Application Data

[63] Continuation-in-part of Ser. No. 154,944, June 21, 1971, abandoned, and Ser. No. 242,347, April 10, 1972, abandoned.

[51] Int. Cl.$^2$ .................................................. B32B 27/40
[52] U.S. Cl. ............................. 428/424; 260/75 NP; 260/75 NT; 260/77.5 AN; 296/84 A; 428/425
[58] Field of Search ............. 161/190; 260/75 P, 75 R, 260/77.5 AP, 77.5 AT, 77.5 AN, 75 NT, 77.5 AM; 428/423–425; 296/84 A

[56] References Cited

U.S. PATENT DOCUMENTS

| 3,620,905 | 10/1969 | Ahramjian | 161/190 |
| 3,823,060 | 7/1974 | McClung et al. | 260/77.5 AT |

Primary Examiner—George F. Lesmes
Assistant Examiner—R. J. Roche
Attorney, Agent, or Firm—Irwin M. Stein

[57] ABSTRACT

Laminated glass articles useful as automobile windshields or in other safety glass applications comprising a polyesterurethane and at least one sheet of glass are described. The polyesterurethane is a thermoplastic, transparent material that is formed preferably from an aliphatic polyester, e.g., poly(1,4-butylene adipate), a cycloaliphatic diisocyanate, e.g., 4,4'-methylene-bis (cyclohexyl isocyanate), and a monomeric aliphatic diol, e.g., 1,4-butane diol.

26 Claims, 1 Drawing Figure

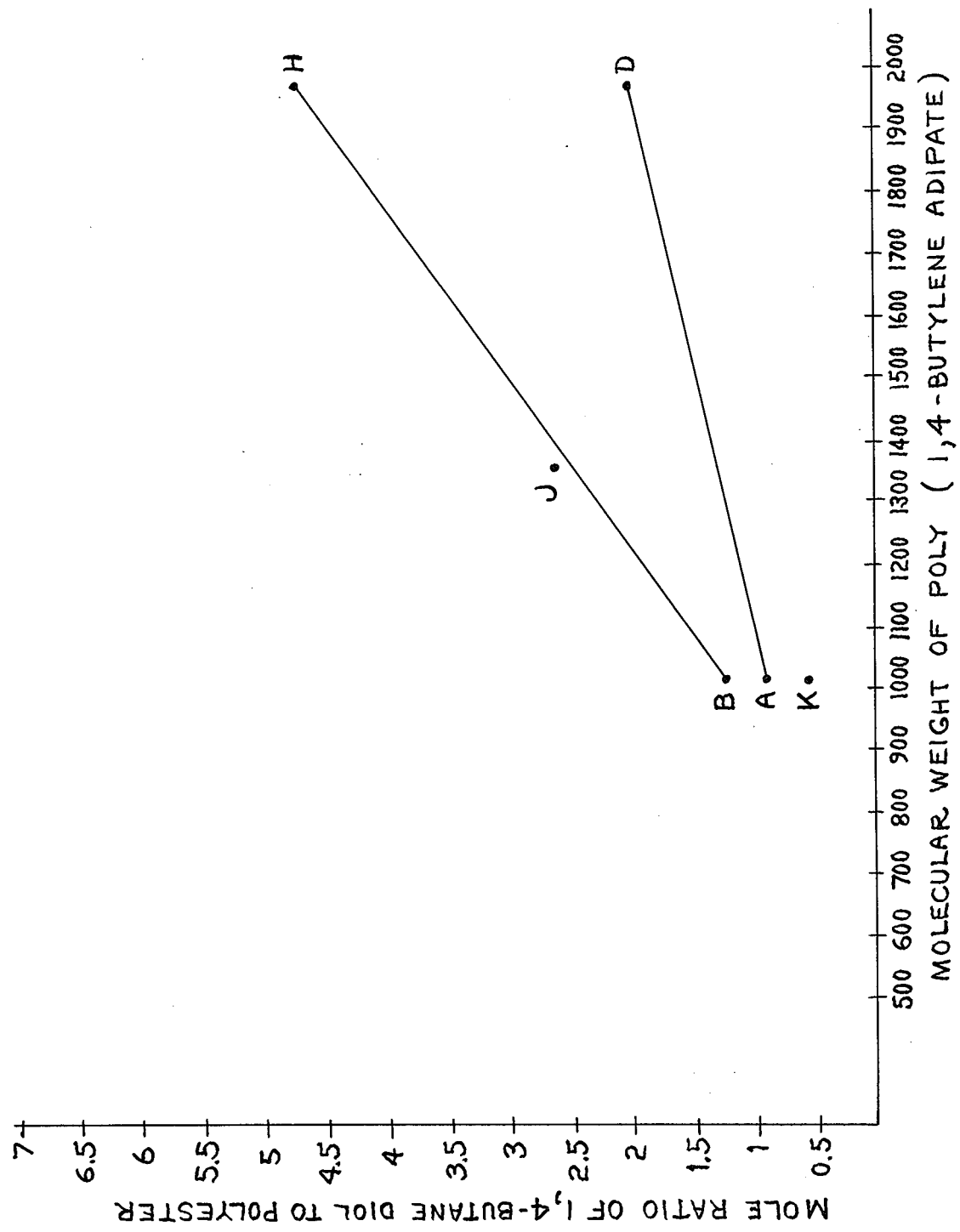

TRANSPARENT, IMPACT-RESISTANT POLYESTERURETHANE LAMINATES

CROSS-REFERENCE TO RELATED APPLICATIONS

This is a continuation-in-part application of our co-pending applications Ser. No. 154,944 filed June 21, 1971 and Ser. No. 242,347 filed Apr. 10, 1972, both now abandoned.

DESCRIPTION OF THE INVENTION

Laminated glass articles are used widely, especially in automobile windshields, aircraft glazing and the like. A common term applied to such laminates, particularly when used in automobiles, is "safety glass." Safety glass is a well-known term for a glass sandwich of a plastic interlayer material that rests between and bonds together two or more glass sheets with such adhesion that the breaking of the glass results in a minimum dispersion of fragments of broken glass. These laminated glass articles are used widely in automobiles and must possess a number of properties among which are: (1) a high impact energy absorption level so as to minimize concussive injury; (2) a shear and tear strength sufficient to prevent tearing from the broken glass; (3) sufficient adhesion to the glass in order to inhibit laceration and prevent broken pieces of glass from flying and injuring anyone nearby; and, (4) good optical transparency.

One difficulty encountered in present day automobile windshields is that, upon breaking, sharp glass edges develop which can result in severe lacerative injuries. In order to avoid this type of injury, the penetration resistance of the windshield must be improved; but, the resistance must not be so great as to cause concussive injury to the occupant of the automobile. Moreover, the windshield must possess these properties over a wide temperature range.

It has now been discovered that laminated glass articles of at least one sheet of glass and particular polyesterurethanes can be employed to provide safety glass which is impact-resistant over a wide range of temperature, causes little lacerative injury and is superior to safety glass prepared with plasticized polyvinyl butyral as the interlayer material. More particularly, the polyesterurethane is the reaction product of (a) a polyester having the ester linkage,

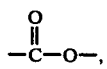

and a pair of groups reactive with isocyanate or isothiocyanate groups; (b) a diisocyanate, diisothiocyanate or a compound containing an isocyanate and an isothiocyanate group; and, (c) a compound containing at least two active hydrogens per molecule reactive with isocyanate or isothiocyanate groups. Components (a) and (c) can have primary or secondary amino groups, hydroxyl groups, mercapto groups, or other active hydrogen groups; but, said components are of substantially different molecular weight. Component (c) is generally a monomeric compound and has a molecular weight much lower than that of (a).

It has been further discovered that a plurality of factors bear importantly and interrelatedly upon the usefulness and effectiveness of polyesterurethanes as interlayers for safety glass applications. Thus, it has been observed that such factors as the chemical composition of the polyesterurethane, as well as the molar relationship of the polymer components, is significant. In many instances, as will hereinafter be more completely and explicitly discussed, the factors are interrelatedly tied to one another.

BRIEF DESCRIPTION OF THE DRAWING

The drawing is a graphical depiction of the plot of the mole ratio of 1,4-butanediol to poly(1,4-butylene adipate) as a function of the molecular weight of the poly(1,4-butylene adipate) for preferred polyesterurethanes of the present invention.

DETAILED DESCRIPTION

Polyester compositions useful in preparing polyesterurethanes that can be used to prepare the above-described laminated glass articles are hydroxy-terminated polyesters having a number average molecular weight of between about 500 and about 5000, particularly between 750 and 4000 and, more particularly, between 1000 and 3300. More preferably, the polyesters are aliphatic, essentially linear polyesters having a number average molecular weight of between about 1000 and about 3300, which are prepared by esterification of an aliphatic dicarboxylic acid, or anhydride thereof, with an aliphatic polyhydric alcohol, e.g., an aliphatic diol. The number average molecular weight of the polyester compositions useful in the present invention can be determined by hydroxyl end group analysis and by the following formula:

$$\text{No. Ave. Mol. Wt.} = \frac{\text{(functionality of the polyester) (56.1)(1000)}}{\text{hydroxyl (OH) number of the polyester}}$$

Polyesters are prepared by well-known esterification techniques of saturated dicarboxylic acids or anhydrides thereof (or combinations thereof) and polyhydric alcohols. Such polyesters and their manner of preparation are well known to the polyester chemist. Many are commercially available in various molecular weights. As used herein, the term "polyester" is intended to include polylactones, e.g., polycaprolactones and polyvalerolactones, which can be prepared by polymerizing a lactone, such as epsilon caprolactone and delta-valerolactone, in the presence of minor amounts of difunctional active hydrogen compounds, such as water or a low molecular weight glycol, e.g., 1,4-butane diol.

Aliphatic dicarboxylic acids suitable for preparing polyester compositions useful in the present invention can be represented by the formula:

wherein R' is an alkylene radical containing from 2 to 12 and preferably from 4 to 8 carbon atoms inclusive. Thus, the dicarboxylic acids contain from 4 to 14 and preferably from 6 to 10 carbon atoms. Examples of such dicarboxylic acids include: succinic acid, glutaric acid, adipic acid, pimelic acid, suberic acid, azelaic acid, and sebacic acid. The corresponding anhydrides can also be used. Adipic and azelaic acid are preferred. Mixtures of dicarboxylic acids also can be used. Unsaturated acids, such as maleic, fumaric, and acetylenic dicarboxylic acids can be employed.

The polyhydric alcohols utilized in the preparation of the polyester compositions of the present invention are preferably aliphatic alcohols containing at least two, and preferably only two hydroxy groups, e.g., straight-chain glycols, containing from 2 to 15 and preferably from 4 to 8 carbon atoms inclusive. The glycols contain hydroxyl groups preferably in the terminal positions and straight chain diols can be represented by the formula:

$$HO-(CH_2)_x-OH \qquad \text{II.}$$

wherein $x$ is a number ranging from 2 to 15. Preferred is 1,4-butanediol, i.e., wherein $x$ is 4.

Examples of polyhydric alcohols of from 2 to 15 carbon atoms inclusive which can be used to form the polyester include: ethylene glycol, diethylene glycol, triethylene glycol, tetraethylene glycol, 1,3-propanediol, 1,3-butanediol, 1,4-butanediol, 1,5-pentanediol, 2,2-dimethyl propane diol, 1,6-hexanediol, 1,7-heptanediol, 1,8-octanediol, 1,10-decanediol, and unsaturated diols such as 2-butene-1,4-diol, 2-butyne-1,4-diol and the like. Mixtures of polyhydric alcohols, e.g., ethylene glycol and propylene glycol, can be employed. Only small amounts, if any, of trifunctional alcohols, such as glycerol or trimethylol propane should be present in order to decrease the possibility of extensive cross-linking since the preferred polyesters are essentially linear. Preferably, no trifunctional alcohols are present.

Preparation of the aforementioned polyester compositions by esterification of aliphatic saturated dicarboxylic acids, or anhydrides thereof, with polyhydric alcohols are well-documented in the literature. Typically, the acid or its anhydride and the alcohol are reacted together by heating a mixture of the reactants at about 210° C. or below, depending on the amount and boiling point of the alcohol used in the esterification process. The amount of acid and alcohol used will vary and depend on the molecular weight of the polyester desired. Since the polyesters preferred for the present invention are hydroxyl terminated, an excess of alcohol is used, i.e., more than one mole of alcohol (diol) per mole of dicarboxylic acid, to obtain linear chains containing a preponderance of terminal hydroxyl groups.

Generally, the esterification reaction is conducted with an esterification catalyst, such as butyl stannoic acid, p-toluene sulfonic acid, stannous octoate, tetrabutyltitanate, dibutyl tin dilaurate, dibutyl tin oxide, stannous chloride, stannous fluoride and stanous oxalate. Any esterification catalyst that is soluble in the reaction mixture can be employed; but, it is desirable that the catalyst used be of such a character that it has no deleterious effect in the final polyester product or does not alter materially and deleteriously the subsequent urethane reaction. The amount of esterification catalyst employed is that amount, i.e., a catalytic amount, which accelerates the esterification reaction to the desired degree. Commonly, from 0.001 to about 0.1 weight percent, e.g., about 0.02 weight percent, based on the reactants is used. If desired, special precautions can be taken to remove the catalyst from the polyester prior to the polyurethane formation.

Polyesterpolyols from lactones can be prepared by subjecting a lactone representable by the formula,

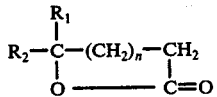

III.

wherein $R_1$ and $R_2$ are each hydrogen, alkyl or cycloalkyl, of 1 to 10 carbon atoms and $n$ is an integer from 0 to 3, preferably 1 to 3, to polymerization (condensation) in the presence of minor amounts of water or a low molecular weight glycol such as ethylene glycol, diethylene glycol, triethylene glycol, 1,4-butanediol, propylene glycol, 1,6-hexanediol, etc. The ring opening and polymerization of lactones is generally effected at temperatures between 50° C. and 300° C. and preferably in the presence of a catalyst. Preparation of polylactones are well known in the polyester art. See, for example, German published application 1,217,019, British Pat. No. 766,347 and U.S. Pat. No. 3,726,887. Suitable lactones include, caprolactones, wherein $n$ is equal to 3, valerolactones, wherein $n$ is equal to 2, butyrolactones, wherein $n$ is equal to 1, and pivalolactone, wherein $n$ is equal to 0 and $R_1$ and $R_2$ are methyl, and such lactones with substituents on the omega carbon atom, such as monoalkyl, e.g., methyl and ethyl substituted lactones, dialkyl, e.g., dimethyl and diethyl substituted lactones, cyclohexyl substituted lactones, etc. The preferred lactones are epsilon-caprolactone and delta-valerolactone, wherein $n$ is equal to 3 and 2 respectively and wherein $R_1$ and $R_2$ are hydrogens.

Examples of preferred polyesters include poly(1,4-butylene adipate), poly(1,4-butylene succinate), poly(1,4-butylene glutarate) poly(1,4-butylene pimelate), poly(1,4-butylene suberate), poly(1,4-butylene azelate), poly(1,4-butylene sebacate), and poly(epsilon caprolactone).

The polyester compositions useful in the present invention can, as indicated, have a number average molecular weight of between about 500 and 5000. It is understood that this is a number average and that the polyester composition is composed of a great number of different molecules of varying length, i.e., from the free glycol to a high molecular weight polyester, in a normal distribution. For example, a poly(1,4-butylene adipate) of 2000 number average molecular weight will have molecular species contained in it ranging from unreacted residual 1,4-butanediol (molecular weight 90) to poly(1,4-butylene adipates) of 5000 molecular weight or higher; but, with the principal constituents of the composition (in weight) being in the near vicinity of 2000 molecular weight to achieve that number average molecular weight.

Hydroxy-terminated polyesters that are especially desirable for use in preparing the polyesterurethanes used in laminated glazing units, such as laminated glass articles exemplified by automobile windshields and aircraft glazing units, are those that have a liquidus temperature of at least about 44° C., preferably at least about 50° C. and, more preferably, at least about 55° C. The term "liquidus temperature" as used herein is the minimum temperature at which complete fusion (melting) of a bulk sample of the polyesterdiol is attained under equilibrium temperature conditions. Liquidus temperatures of various polyesterdiols are listed in the following table along with the nominal molecular weight of the polyester and the source of the polyester (identified by letter).

TABLE I

| Polyesterdiol Type | Polyesterdiol Liquidus Temperature | | |
|---|---|---|---|
| | Nominal No. Avg. Molecular Weight | Supplier Source | Liquidus Temperature,° C |
| Poly(ethylene/ | 1000 | A | <38° |
| propylene)adipate | 1200 | A | <38° |

TABLE I-continued

| Polyesterdiol Type | Polyesterdiol Nominal No. Avg. Molecular Weight | Supplier Source | Liquidus Temperature, °C |
|---|---|---|---|
| diol* | 1225 | A | <38° |
| | 1200 | B | <38° |
| | 1900 | C | <38° |
| | 1000 | D | >50.9°, ≤51.9° |
| | 1900 | D | >53.8°, ≤55.0° |
| Poly(ethylene adipate) diol | 1000 | D | >57.8°, ≤58.8° |
| | 2000 | D | >62.0°, ≤63.0° |
| Poly(1,4-butylene adipate)diol | 500 | A | >44.3°, ≤44.9° |
| | 550 | A | >46.0°, ≤47.0° |
| | 775 | A | >50.9°, ≤51.9° |
| | 1000 | D | >55.0°, ≤55.9° |
| | 2000 | D | >59.8°, ≤60.8° |
| | 3000 | A,B | >60.8°, ≤62.0° |
| | | A | |
| | 5700 | A | >63.0°, ≤63.9° |
| Poly(1,4-butylene azelate) diol | 2000 | D | >43.7°, ≤44.3° |
| Poly(1,6-hexylene adipate)diol | 1000 | D | >51.9°, ≤52.9° |
| Poly(ε-caprolactone) diol | 830 | E | >44.3°, ≤44.9° |
| | 1000 | A | >49.0°, ≤50.0° |
| | 1250 | E | >51.9°, ≤52.9° |
| | 2000 | E | >56.9°, ≤57.8° |

*The polyester diols obtained from suppliers A, B and C contained a higher molar proportion of propylene glycol to ethylene glycol than the polyester diol obtained from supplier D.

The liquidus temperature of the polyesterdiols in Table I were obtained in the following manner. A large sample of the polyesterdiol was melted thoroughly in a 75° C.–80° C. oven for a period of at least 24 hours. After melting, the polyesterdiol was homogenized by thorough agitation and about a 10 gram sample taken from the homogenized mass. The sample was placed in a pre-dried 18mm × 150mm Pyrex test tube and allowed to solidify completely at ambient temperatures for a period of not less than one day.

The test tube containing the solidified sample was placed in a thermoregulated water bath. After insertion of the test tube into the bath, the temperature of the bath was increased from ambient room temperature to 37.5° C. In the temperature range of from 37.5° C.–45° C., the temperature of the bath was raised incrementally in approximately 0.5° C. steps. In the temperature range from 45° C. to 60° C. the temperature was increased incrementally in about 1.0° steps. After each incremental increase in temperature, the sample was allowed to equilibrate in the water bath for a period of not less than 1½ hours, after which the sample was inspected visually for its degree of fusion. Thermal equilibrium was determined to occur within five minutes of the incremental temperature increase. During the successive incremental temperature increases, the polyesterdiol sample would first appear somewhat translucent or opalescent; then apear hazy to various degrees; and finally, appear clear when the liquidus temperature was reached. The liquidus temperature in Table I for samples have a liquidus temperature greater than 38° C. is defined as a range because of the incremental manner in which the temperatures were increased. Thus a liquidus temperature specified as >49.0° C. and ≤ 49.9° C. would indicate that the sample was not completely melted at 49.0° C. but was completely melted at 49.9° C.

In addition to the preferred aliphatic polyesters, polyesters prepared from aromatic dicarboxylic acids and polyhydric alcohols can be used. Aromatic dicarboxylic acids that can be employed include mononuclear dibasic acids, particularly terephthalic acid and isophthalic acid, and dinuclear acids, which are preferably joined through an alkyl group such as the following: 4,4'-isopropylidene-dibenzoic acid; 4,4'-(2,2-butylidene) dibenzoic acid; 4,4'-1,1,2,2-tetramethylethylene)dibenzoic acid; 4,4'-(1,1,2,2-tetra methylene)benzoic acid; 4,4'-(1,1,2,2-tetrapropylethylene)dibenzoic acid; 4,4'-(1,1,2,2-tetrabutylethylene)dibenzoic acid; 3,3'-isopropylidenedibenzoic acid; 2,2'-isopropylidenedibenzoic acid; 4,4'-(1,2-diethyl-1,2-dimethylethylene)dibenzoic acid; 2,2'-(1,1,2,2-tetraethylethylene)dibenzoic acid; 2,2'-(1,1,2,2-tetrabutylethylene)dibenzoic acid; 4,4'-(2,2-butylidene) dibenzoic acid; 3,3'-(2,2-butylidene)dibenzoic acid; 2,2'-(2,2-butylidene) dibenzoic acid; 4,4'-(2,2-pentylidene)dibenzoic acid; 3,3'-(2,2-pentylidene) dibenzoic acid; 2,2'-(2,2-pentylidene)-dibenzoic acid; 4,4'-(3,3-pentylidene) dibenzoic acid; 3,3'-(3,3-pentylidene)dibenzoic acid; 2,2'-(3,3-pentylidene) dibenzoic acid; 4,4'-(2,2-hexylidene)dibenzoic acid; 3,3'-(2,2-hexylidene) dibenzoic acid; 2,2'-(2,2-hexylidene dibenzoic acid; 4,4'-(3,3-hexylidene) dibenzoic acid; 4,4'-(3,3-heptylidene)dibenzoic acid; 3,3'-(3,3-heptylidene) dibenzoic acid; 4,4'-(4,4-heptylidene)dibenzoic acid; 4,4'-(4,4-octylidene) dibenzoic acid; 3,3'-(4,4-octylidene)dibenzoic acid; 2,2'-(4,4-octylidene) dibenzoic acid; 4,4'-(5,5-nonylidene)dibenzoic acid; 3,3'-(5,5-nonylidene) dibenzoic acid; 2,2'-(5,5-nonylidene)dibenzoic acid.

The polyhydric alcohols, e.g., diols, reacted with the aforesaid aromatic acids are preferably aliphatic diols of from 2 to 15, preferably 4 to 8, carbon atoms, e.g., 1,4-butanediol. Other diols can be employed, however, such as the mononuclear aromatic phenols, particularly resorcinol, and the polynuclear aromatic phenols corresponding to the aforesaid aromatic acids, particularly Bisphenol A.

Among the organic polyisocyanates that can be employed to prepare polyesterurethanes are the various organic compounds containing two or more isocyanato groups, or mixtures of such compounds, including aromatic, aliphatic and cycloaliphatic diisocyanates. Preferred are the cycloaliphatic diisocyanates.

Cycloaliphatic diisocyanates used to prepare the polyesterurethanes of the present invention can be mono- or polynuclear, i.e., contain one or two cycloaliphatic rings in the compound. The cycloaliphatic diisocyanates are significantly more stable to ultraviolet (UV) light than the aromatic diisocyanates, such as toluene diisocyanate (TDI) and methylene diphenyl diisocyanate (MDI) and, therefore, UV light stabilizers are generally not required in preparing polyurethanes when they are used. In addition, cycloaliphatic diisocyanates produce polyurethanes with relatively high levels of impact energy absorption, which makes such polyurethanes useful in safety glass applications.

The cycloaliphatic diisocyanate employed to react with the above-described polyesterdiol is preferably a polynuclear compound, e.g., 4,4'-dicyclohexyl diisocyanate and compounds containing two cycloaliphatic rings joined by an alkylene group of from 1 to 3 carbon atoms inclusive, or a lower alkyl ($C_1$–$C_4$) substituted alkylene group, e.g., an isopropylidene group. These polycycloaliphatic compounds can be referred to as 4,4'-alkylene-bis(cyclohexyl isocyanates). The cycloaliphatic diisocyanates useful in the present invention can be substituted with other groups, such as the nitro, halogen, e.g., chlorine, alkyl, alkoxy, etc. groups, that are not reactive with the hydroxyl groups of the polyester polyol and that do not render the isocyanate group unreactive.

The preferred cycloaliphatic diisocyanate is 4,4'-methylene-bis(cyclohexyl isocyanate), which is hydrogenated MDI. This diisocyanate is commercially available in different stereo isometric mixtures. Since each isocyanate functional group can be either cis or trans to the carbon hydrogen on the ring adjacent to the bridging methylene group of the compound, the product can be composed of cis-cis, cis-trans, and trans-trans isomers. Advantageously, the aforementioned diisocyanate contains from 10 to 100 percent of the trans-trans isomer. Preferred, is the liquid 4,4'-methylene-bis(cyclohexyl isocyanate) containing less than 26 percent of the trans-trans isomer and less than 72 percent of the cis-cis isomer, e.g., from 10 to 26 percent of the trans-trans isomer. The isomer ratio is controlled by procedures used to prepare the diisocyanate. One such product is sold by the E. I. duPont de Nemours and Company under the trademark "Hylene W". This product has a total stereoisomer ratio of about 55 percent trans and about 45 percent cis isomers. This commercially available material has been reported to have a trans-trans isomer content of about 19 to 21 percent, a cis-cis isomer content of from 17 to 18 percent and a cis-trans isomer content of from about 62 to 64 percent and is liquid at room temperature (30° C.). This diisocyanate can also contain typically a minor amount of monoisocyanate, e.g., from about 0.27 to about 0.6 percent; a total acidity (as HCl) of between 0.001 and about 0.002 percent by weight, and an isocyanate content of about 99.8 percent of theoretical. This cycloaliphatic diisocyanate compound has been sold by the Allied Chemical Company under the trademark "Naccaonate H-12" in a total stereoisomer mixture of about 30 percent total cis isomers and about 70 percent total trans isomers.

Examples of suitable cycloaliphatic diisocyanates include: 4,4'-methylene-bis(cyclohexyl isocyanate), 4,4'-methylene bis(3-methyl cyclohexylisocyanate), hydrogenated toluene diisocyanate (including hydrogenated products of: a. the 2,4-isomer; b. the 2,6-isomer; c. the 80/20-2,4-/2,6-isomer mixture; and d. the 65/35-2,4-/2,6-isomer mixture), 4,4'-isopropylidene-bis(cyclohexyl isocyanate), 1,4-cyclohexane diisocyanate, 4,4'-dicyclohexyl diisocyanate, 2,4'-dicyclohexyl diisocyanate and 3-isocyanato methyl-3,5,5-trimethylcyclohexane diisocyanate (IPDI). Further, corresponding cycloaliphatic diisocyanates prepared by hydrogenating other of the aromatic diisocyanate compounds described herein can be used. Mixtures of the aforementioned diisocyanates also can be used. When used as the principal diisocyanate reactant, it is contemplated that the cycloaliphatic diisocyanates can include minor amounts, i.e., less than 1 weight percent, of other diisocyanates such as toluene diisocyanate (TDI), diphenylmethane diisocyanate (MDI), and other aromatic diisocyanates.

In addition to the most preferred cycloaliphatic diisocyanates, straight chain aliphatic diisocyanates such as 1,4-tetramethylene diisocyanate, 1,6-hexamethylene diisocyanate, and 1,10-decamethylene diisocyanate can be employed. Suitable aromatic diisocyanates that can be employed include the mononuclear types such as 2,4-toluene diisocyanate, 2,6-toluene diisocyanate, and the commercial mixtures comprising 80 percent 2,4-toluene diisocyanate, and 20 percent 2,6-toluene diisocyanate, as well as the corresponding 65/35 mixture, and m-phenylene diisocyanate; polynuclear aromatic diisocyanates such as 4,4'-diphenylene diisocyanate and 1,5-naphthalene diisocyanate, halogen substituted aromatic diisocyanates such as 4-chloro-1,3-phenylene diisocyanate, alkyl substituted diisocyanates such as 3,3'-dimethyl-4,4'-diphenylene diisocyanate, the xylene diisocyanates including 1,3-xylene diisocyanate and 1,4-xylene diisocyanate, and the durene isocyanates such as 2,3,5,6-tetramethyl-1,4-diisocyanate; aromatic-cycloaliphatic diisocyanates such as 1,5-tetrahydronaphthalene diisocyanate; polynuclear aromatic diisocyanates bridged through aliphatic groups such as diphenylmethane diisocyanate (MDI), 4,4'-methylene bis(3-methylphenylisocyanate), and isopropylidene-4,4'-diphenyldiisocyanate; alkoxy substituted aromatic diisocyanates such as dianisidine diisocyanate; mononuclear aralkyl diisocyanates such as xylylene diisocyanates and particularly the 70/30 meta-para isomer mixture; aliphtic branched diisocyanates such as 2,2,4-trimethylhexamethylene diisocyanate (TMDI); and ester containing aliphatic diisocyanates such as 2,6-diisocyanato methyl caproate (Lysine diisocyanate). In addition, sterically hindred types such as 3,5-diethylmethylene-bis(4-phenylene isocyanate), 3-isocyanato methyl-3,5,5-trimethylcyclohexyl diisocyanate (IPDI) and 2,6-diethyl-1,4-phenylene diisocyanate, in which the two isocyanate groups differ greatly in reactivity, can also be employed.

Polynuclear diisocyanates in which one of the rings is saturated and the other aromatic can be employed which are prepared by partially hydrogenating the amine precursor for aromatic diisocyanates such as diphenyl methane diisocyanate, diphenyl isopropylidene diisocyanate and diphenylene diisocyanate. In addition, diisocyanates can be employed which are bonded through sulfonyl groups such as 1,3-phenylene disulfonyl diisocyanate, and 1,4-xylyene disulfonyl diisocyanate. Mixtures of diisocyanates can also be employed particularly mixtures of the preferred cycloaliphatic diisocyanates such as 4,4'-methylene-bis(cyclohexyl isocyanate) with the commerical isomer mixtures of toluene diisocyanates or m-phenylene diisocyanate.

Although not presently commercially available, isothiocyanates corresponding to the above diisocyanates can be employed as well as mixed compounds containing both an isocyanate and isothiocyanate group. Exemplary of suitable diisothiocyanates are: 4,4'-methylene-bis(cyclohexyl isothiocyanate), toluene diisothiocyanate, methylene diphenyl diisothiocyanate, 1,6-hexamethylene diisothiocyanate, m-phenylene diisothiocyanate, 4,4'-diphenylene diisothiocyanate, diphenyl isopropylidene diisothiocyanate and 3-thiocyanato methyl-3,5,5-trimethylcyclohexyl diisothiocyanate. Exemplary of suitable mixed compounds are: 4-isocyanato 4'-isothiocyanato diphenyl methane, 2-isocyanato 4-isothiocyanato toluene, 1-isocyanato 6-isothiocyanato hexane, 4-isocyanato 4'-isothiocyanato diphenyl, and 4-isocyanato 4'-isothiocyanato diphenyl isopropane. In addition, monoisocyanates with sulfonyl chloride groups can be reacted with unsaturated organic compounds by a simple addition reaction to form high molecular weight diisocyanates. These are described by Oertel et al in *Polymer Preprints ACS Div. of Polymer Chem.*, Sept. 1968, Vol. 9, No. 2, pages 1520–7. Unless clearly indicated to the contrary, as used herein, the term diisocyanates is intended to include diisothiocyanates and compounds containing both an isocyanate and isothiocyanate group.

The active hydrogen compound employed to react with the above-described polyester and diisocyanate is a compound having a molecular weight less than 250 and containing at least two active hydrogens per molecule reactive with isocyanate or isothiocyanate groups. Preferably, such compound has only two active hydrogens per molecule. The term "active hydrogen" is well known in the chemical arts and is defined by the Zerewitinoff test described by Kohler in *J. Am. Chem. Soc.*, 49 3181 (1927). Accordingly, active hydrogens include hydrogen atoms attached to oxygen, nitrogen, or sulfur, and thus useful compounds will include those having at least two of such groups (in any combination). Examples of such groups include: —OH, —Sh, —NH, —NH₂, —COOH, —CONH₂, —SO₂OH, —SO₂NH₂ and —CONHR wherein R is an organic radical. The remainder of the compound to which such groups are attached can be aliphatic, aromatic, cycloaliphatic, or of a mixed type.

Preferred as the active hydrogen compound are the saturated symmetrical and unsymmetrical aliphatic diols having from 2 to 15, e.g., 4 to 8 carbons. Examples thereof include: ethylene glycol, 1,3-propanediol, 1,4-butanediol, 1,3-butanediol, 1,6-hexanediol, 1,8-octanediol, and 1,10-decanediol, etc., and mixtures of such diols. Most preferred are diols that contain the hydroxyl group in the terminal position and do not have ether, carboxyl, ester or other non-hydrocarbon linkages. Thus, the most preferred active hydrogen compounds are linear symmetrical saturated aliphatic diols with the hydroxyl groups in the terminal position. Of the aliphatic diols, 1,4-butanediol is preferred.

Less preferred than the saturated aliphatic diols for the preparation of thermoplastic, transparent polyesterurethanes used to prepare impact resistant laminated glass articles are active hydrogen compounds that are exemplified by the following enumerated compounds: unsaturated aliphatic diols such as the butene and butyne diols and particularly 2-butene-1,4-diol, and 2-butyne-1,4-diol; dihydroxy terminated esters such as hydroxypivalyl hydroxypivalate; cycloaliphatic diols, such as 1,4-cyclohexane dimethanol; mononuclear aromatic phenols, such as resorcinol; aromatic polynuclear diols which are preferably bridged by an alkylene radical of from 1 to 3 carbon atoms such as 4,4'-dihydroxy diphenyl dimethylmethane (Bisphenol A) and 4,4'-dihydroxy diphenylmethane; and the corresponding polynuclear aliphatic compounds. Similarly, aminoalcohols, diamines, sulfonamides, mercapto terminated derivatives and mixtures, and the like, can be employed as the active hydrogen compound. Exemplary of such compounds are: monoethanolamine, 4-aminobenzoic acid, 4-aminobenzamide, sulfanilamide, aminopropionic acid, 4-hydroxybenzoic acid, p-aminophenol and beta-hydroxypropionic acid. Suitable sulfonamides include: 1,3-propanedisulfonamide, 1,4-cyclohexane-disulfonamide, and 1,4-butanedisulfonamide. As indicated hereinbefore, compounds containing non-hydrocarbon linkages such as diols in which the organic radical is interrupted by a chalcogen such as, for example, diethylene glycol, diethylene thioglycol or the bis-beta-hydroxy ethyl ether of hydroquinone are less preferred as the active hydrogen compound.

Amines that are useful as the active hydrogen compound in the preparation of polyesterurethanes can be primary or secondary diamines in which the radicals attached to the nitrogen atoms can be saturated or unsaturated, aliphatic, alicyclic, aromatic, aromatic-substituted aliphatic, aliphatic-substituted aromatic or heterocyclic. Mixed amines in which the radicals are different such as, for example, aromatic and aliphatic can be employed and other reacted groups can be present attached either to carbon atoms or nitrogen atoms, such as carboxyl, hydroxyl, halogen, or nitroso. Exemplary of suitable aliphatic and alicyclic diamines are the following: 1,2-ethanediamine, 1,2-propanediamine, 1,3-propanediamine, 1,3-butanediamine, 1,4-butanediamine, 1,5-pentanediamine, 1,6-hexanediamine, 1,8-octanediamine, diaminopropyltetramethylenediamine, 1,8-methanediamine, and isophoronediamine.

Aromatic diamines such as the phenylene diamines and the toluene diamines can be employed. Exemplary of the aforesaid amines are: o-phenylenediamine, m-phenylenediamine, p-phenylenediamine, 4-m-tolylenediamine, and p-tolylenediamine. N-alkyl and N-aryl derivatives of the above amines can be employed such as, for example, N,N'dimethyl-o-phenylenediamine, N,N'-dimethyl-m-phenylenediamine, N,N'-diphenyl-m-phenylenediamine, N,N'-di-p-tolyl-m-phenylenediamine, N,N'-di-2-naphthyl-m-phenylenediamine, N,N'-dimethyl-p-phenylenediamine, N,N'-diethyl-p-phenylenediamine, N,N'-di(sec-butyl)-p-phenylenediamine, p-aminodiphenylamine, N,N'-diphenyl-p-phenylenediamine and N,N'-di-2-naphthyl-p-phenylenediamine.

Polynuclear aromatic diamines can be employed in which the aromatic rings are attached directly by means of a single carbon-carbon bond such as, for example, 4,4'-biphenyldiamine and 3,3'-dimethyl-4,4'-biphenyl diamine.

Other amines which can be employed are represented by the general formula:

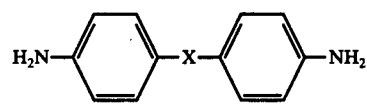

IV.

wherein X is a divalent radical, such as —O—, —S—, the group

V.

or

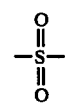

VI.

or a divalent hydrocarbon radical or substituted divalent hydrocarbon radical which rarely contains more than 8 carbon atoms linking two aniline groups

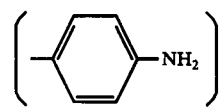

VII.

together. Some of these materials are prepared, as is understood by the art, by condensing aniline with an aldehyde, such as formaldehyde, acrolein, butyraldehyde, and like aldehydes containing up to about 8 carbon atoms, or a ketone such as acetone, methyl ethyl ketone, or like ketones containing up to about 8 carbon atoms. Some of these compounds are in monomeric form, others are in more complex polymeric form and contain two or more amino groups (preferably two):

When X is the divalent radical,

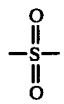

VIII.

the compounds are diaminodiphenyl sulfones, the simplest member of which is p,p'-diaminodiphenyl sulfone. Other diaminodiphenyl sulfones include 3,3'-diaminodiphenyl sulfone, 4,4'-diamino-3,3'-dichlorodiphenyl sulfone, 3,4'-diamino-3,4'-dichlorodiphenyl sulfone and like diamino sulfones containing other substituents on the phenyl nuclei including 1 to 4 carbon: alkyl, alkoxy, and alkenyl groups, most notable of which are the methyl and methoxy substituents. Exemplary of suitable secondary amines containing sulfone groups are the following: N,N'-dimethyl-4,4'-diaminodiphenyl sulfone, N,N'-dimethyl-4,4'-diamino-3,3'-dichlorodiphenyl sulfone, N,N'-diethyl-diaminodiphenyl sulfone, N,N'-diethyl-4,4'-diamino-3,3'-dichlorodiphenyl sulfone, N,N'-methylethyl-4,4'-diaminodiphenyl sulfone, N,N'-dimethyl-3,4'-diamino sulfone, N,N'-dimethyl-3,3'-diamino-4,4'-dichlorodiphenyl sulfone, and the like, including other diaminodiphenyl sulfones having from 1 to 4 ring substituents on each phenyl nucleus. Among such substituents are the halogens most notably chlorine; alkyl, alkoxy and alkenyl, usually of from 1 to 4 carbon atoms, exemplified by methyl and ethyl; methoxy, ethoxy and 2-chloroethoxy; allyl and vinyl groups.

Materials of a functionality greater than 2 can also be employed in addition to the actual hydrogen compound when crosslinking is desired and particularly trifunctional materials such as triethanolamine, trimethylol propane, trimethylol heptane, trimethylol octane, castor oil, polyether polyols, polyester polyols, nitrogen-containing polyols such as, for example, the reaction products of alkylene oxides with urea or similar compounds, and others.

The amount of each reactant used relative to the other reactants will, of course, vary with the properties of the particular polyester-urethane desired, the intended use of the polyesterurethane, and the particular reactants, e.g., polyester, active hydrogen compound and diisocyanate, used. In general, for the preparation of thermoplastic, transparent polyesterurethanes useful for the preparation of impact resistant laminated glass articles having good penetration resistance over a wide temperature range, the mole ratio of active hydrogen compound to the polyester having a liquidus temperature of at least about 44° C. and a molecular weight of between about 500 and about 5000 can vary between about 0.4:1 and about 10:1, e.g., between 0.5:1 and 10:1. The mole ratio of active hydrogen compound, e.g., an aliphatic diol such as 1,4-butanediol, to the polyester will, as indicated in the accompanying drawing typically increase with increasing molecular weight of the polyester.

The amount of diisocyanate used to react with the polyesterdiol and active hydrogen compound, e.g., aliphatic diol, to form the polyester-urethane will depend on the amount of polyesterdiol and the amount of active hydrogen compound used. Typically, the number of moles of diisocyanate used will equal substantially the sum of the moles of polyesterdiol plus the moles of active hydrogen compound, i.e., a stoichiometric amount, so that there is essentially complete reaction of the diisocyanate and the active hydrogens present on the diol reactants. Stated another way, the total number of labile or active hydrogen atoms, e.g., hydroxyl groups, on the polyester and active hydrogen compound reactants is approximately numerically equivalent to the number of isocyanate groups supplied by the diisocyanate reactant. When a stoichiometric excess of one reactant specie, i.e., isocyanate or hydroxyl group, is used, it is preferred that a slight excess of hydroxyl groups (active hydrogens), e.g., up to 5 or 10 percent, is employed. The polyesterurethane reaction product is therefore, substantially free of isocyanate groups, i.e., the product contains less than 0.6 weight percent preferably less than 0.3 weight percent and more preferably less than about 0.08 weight percent isocyanate groups. While it is preferred that the sum of the molar amount of polyesterdiol and low molecular weight active hydrogen compound reacted is substantially stoichiometrically equivalent to the molar amount of diisocyanate, a slight excess of unreacted hydroxyl group or isocyanate groups in the polyesterurethane reaction product can be tolerated. Thus, an isocyanate (—NCO): labile hydrogen (hydroxyl) ratio in the reaction mixture of from about 0.95:1 to about 1.05:1 preferably between about 0.97:1 and about 1.03:1, more preferably between about 0.98:1 and about 1.01:1 can be used.

It has been noted that for polyesterurethanes prepared from hydroxy-terminated polyesters having number average molecular weights ranging from 500 or 750 to 5,000 and more particularly for polyesterurethanes prepared from poly(1,4-butylene adipates) of between about 1,000 and about 4,000 molecular weight, which are intended for use in impact resistant laminated glass articles, e.g., as the interlayer in safety glass applications, exceptionally good results are obtained when the molar proportion of the polyester reactant to the compound having a pair of active hydrogens (e.g., 1,4-butanediol) is controlled within a particular range. Moreover, it has been observed that such proportions also depend upon the number average molecular weight of the polyesterdiol, e.g., poly(1,4-butylene adipate) used; that is, the molar ratio of the polyesterurethane forming components is not necessarily the same with different molecular weight polyesters, e.g., poly(butylene adipates). Polyesterurethane interlayers made from poly(1,4-butylene azelate) as the polyesterdiol reactant also exhibit excellent impact resistant properties; but, for convenience the following discussion will be directed to poly(1,4-butylene adipates), it being understood that in many cases the two polyesters are interchangeable.

The interrelationship which has been observed respecting proportioning of the polyesterurethane forming components can be illustrated best by reference to and discussion of a particular class of preferred polyesterurethanes. Thus, it has been found pursuant to a particular embodiment of this invention that especially effective safety glass interlayer compositions are provided by polyesterurethanes of (a) hydroxy-terminated poly(1,4-butylene adipates) having a number average molecular weight of between 1,000 and 4,000, e.g., between 1,000 and 3,300, (b) 4,4'-methylene-bis-(cyclohexyl isocyanate) wherein about 55 percent of the total isocyanate (—NCO) groups are trans and about 45 percent of the total isocyanate groups are cis and (c) 1,4-butanediol.

Other things being substantially unchanged, it has been discovered that with respect to the aforementioned polyesterurethane compositions, exceptional interlayer materials are obtained when the ratio of 1,4-butanediol to poly(1,4-butylene adipate) is controlled within certain limits, which limits have been observed to vary depending upon the molecular weight of the poly(1,4-butylene adipate). Thus, when the polyesterdiol, e.g., poly(1,4-butylene adipate), has a number average molecular weight of about 1000, superior interlayer compositions have resulted by the use of between about 0.4 and about 1.2, e.g., between about 0.9 and 1.2 moles of aliphatic diol, e.g., 1,4-butanediol, per mole of the poly(1,4-butylene adipate). When the ratio of 1,4-butanediol to poly(1,4-butylene adipate) exceeds about 1.2:1, loss of optimum performance in safety glass applications is noted when the laminate is at a temperature of 0° F. because the interlayer is brittle. Brittle interlayers are undesirable because there is little diaphragm action when the laminate is ruptured thereby increasing the likelihood of concussive, lacerative, and penetration injury. Within the aforesaid molar ratio range, such polyesterurethane compositions provide glass laminates that are superior to commercial plastic interlayer compositions in penetration resistance. More particularly, safety glass laminates prepared with the present polyesterurethanes are superior in impact resistance at all temperatures at comparable thickness to conventional safety glass, i.e., glass laminates prepared with a 30 mil plasticized polyvinyl butyral, within the broad temperature range from 0° F. to 120° F.

It has been the observation respecting glass laminates having a plastic interlayer material, which laminates exhibit effective penetration resistance at a first temperature, that when variations in the plastic interlayer composition are made to improve performance at another temperature, the impact properties of the laminates at the first temperature suffer. Similarly, in the present case, it is also possible to adjust the proportions of the polyesterurethane forming reactants such that the laminate is unusually effective at a particular temperature. Thus, for example, when a laminate is desired having particularly good properties at 0° F., the ratio of 1,4-butanediol to poly(1,4-butylene adipate) of 1,000 molecular weight can be reduced to 0.4 or less, e.g., 0.2-0.4. While this is desirable for laminates which are to be employed at 0° F., it is generally not desirable for windshields where a broad temperature range of properties is desired. When it is desired to provide laminates having exceptional high temperature, e.g., 120° F., properties, the ratio of 1,4-butanediol to poly(1,4-butylene adipate) of 1,000 molecular weight can be increased to as high as 6 or more. To obtain the overall broad temperature performance, however, with the aforementioned polyesterurethane forming components, the ratio of aliphatic diol to polyesterdiol is a rather narrow one, i.e., between 0.4:1 and about 1.2:1.

It has been found further that when the poly(1,4-butylene adipate) has a number average molecular weight of about 2,000, the molar ratio of components can be considerably expanded from the range described with respect to 1,000 molecular weight poly(1,4-butylene adipate) and superior compositions still prepared. For example, the ratio of 1,4-butanediol to poly(1,4-butylene adipate) of 2,000 molecular weight can be between about 1.5:1 and about 5:1, e.g., between about 2:1 and about 5:1, and glass laminates prepared with such polyesterurethanes have superior properties over a wide temperature range when compared to conventional glass laminates prepared with plasticized polyvinyl butyral. When the aforementioned molar ratio exceeds about 5.1:1, however, such laminates become brittle at 0° F. When, however, good high temperature performance properties are desired, the molar ratio can be as high as about 10:1 or more and when low temperature properties are desired, the molar ratio of 1,4-butanediol to poly(1,4-butylene adipate) can be 1:1 or 0.5:1 or less, e.g., 0.4:1.

Polyesterurethanes can be prepared also employing a physical mixture of two or more polyesters of different molecular weight. For example, polyesterurethanes can be prepared from a mixture of the aforesaid 1,000 and 2,000 number average molecular weight poly(1,4-butylene adipates). Thus, polyesterurethanes useful as interlayers in glass laminates can be made also from a mixture of poly(1,4-butylene adipates) that combined have a total number average molecular weight of between about 1000 and about 4000. With these preferred molecular weight poly(1,4-butylene adipates), polyesterurethane interlayers can be prepared having superior impact properties over a wide temperature range, e.g., from 0° F. to 120° F., when the molar ratio of 1,4-butanediol to poly(1,4-butylene adipate) is between about 0.4:1-8:1, e.g., 1:1 to 6:1, depending on the total number average molecular weight of the poly(1,4-butylene adipates) mixture. The higher the number average molecular weight, the higher the said molar ratio. When superior performance is desired at a particular temperature without regard to performance at other temperatures, e.g., 0° F. vs. 120° F., the molar ratios can be varied further.

This interrelationship between the molar ratio of aliphatic diol and polyesterdiol to number average molecular weight of polyesterdiol is shown by the data presented in Table II and the accompanying drawing. The polyesterurethanes of Table II (Examples A-K) were prepared by the general procedure and conditions of Example 1 except that no catalyst was intentionally added. Test safety glass laminates were prepared from such polyesterurethanes by laminating a sheet of the polyesterurethane between two sheets of 12 × 12 × ⅛ inch glass at 275° F.-350° F. and 200 psi for about 45 minutes in an autoclave. These laminates were tested for impact resistance by dropping a 5-pound steel ball onto the laminate.

TABLE II

| Example | 1014 MW PBA (Moles) | BDO (Moles) | Hylene W (Moles) | Interlayer Thickness (Inches) | Autoclave Temp.° F. | Mean Penetration Velocity (MPH) | | |
|---|---|---|---|---|---|---|---|---|
| | | | | | | 0° F. | 70° F. | 120° F. |
| K | 1.00 | 0.64 | 1.64 | .030 | 275 | >24, >30, >35 | 26, 23, <35 | 15, 18, 20 |
| A | 1.00 | 0.91 | 1.91 | .032 − .036 | 275 | >32, >37 | 34, 34, 34 | 18, 24, 29 |
| B | 1.00 | 1.21 | 2.21 | .038 − .048 | 275 | >30, 36, >37 | 35, 35, 36 | 26, 27 |
| C | 1.00 (1010 MW) 1965 MW PBA | 1.58 | 2.58 | .032 − 0.36 | 275 | Brittle | 36, >37 | <35, 35 |
| D | 1.00 | 2.00 | 3.00 | .031 − .037 | 275 | >30, 34, 37 | 25, 25, 28 | 20, 20, 22, |

TABLE II-continued

| Example | 1014 MW PBA (Moles) | BDO (Moles) | Hylene W (Moles) | Interlayer Thickness (Inches) | Autoclave Temp.° F. | Mean Penetration Velocity (MPH) | | |
|---|---|---|---|---|---|---|---|---|
| | | | | | | 0° F. | 70° F. | 120° F. |
| E | 1.00 | 2.71 | 3.71 | Approx. 030 | 350 | <37 >37 | 30 32 | <24 25 |
| F | 1.00 | 3.11 | 4.11 | Approx. 030 | 350 | >32, 35 | 32 | 23, 30 |
| G | 1.00 | 4.13 | 5.13 | Approx. 030 | 275 | <30, 13 | 23, 24, 28 | 19, 22, 23 |
| | | | | | | (Z-6020 primer used to prepare laminate) | | |
| H | 1.00 | 4.67 | 5.67 | .030 | 275 | 23, 26, 28 | 26, 28, 29 | 25, <30, 27 |
| | | | | | | (Z-6020 primer used to prepare laminate) | | |
| I | 1.00 | 5.17 | 6.17 | .032 − .041 | 275 | Brittle | 35, 35, >35 36 | >24, >27, 30 <32 |
| J | 0.70 Mole 1014 MW 0.40 Mole 1965 MW Av. 1360 MW | 2.89 | 3.99 | .034 − .037 | 275 | 34, >35 | 33, 35 | 25, <27 |

Z-6020 is Dow Corning Trademark for N-(beta-aminoethyl)gamma - aminopropyltrimethoxysilane
PBA is poly(1,4-butylene adipate)
BDO is 1,4-butanediol
Hylene W is 4,4'-methane-bis(cyclohexylisocyanate) in a stereoisomer ratio of 55% trans, 45% cis The data of Table II shows that the laminated glazing units prepared with the polyesterurethane interlayers tested were brittle at 0° F. when 1.58 moles of 1,4-butanediol per mole of nominal 1,000 molecular weight polyesterdiol was employed; but that polyesterurethane interlayers formed from the higher nominal 2,000 molecular weight polyesterdiol were not brittle until about 5.1 moles of 1,4-butanediol per mole of polyesterdiol were used. Thus, it can be seen that the higher molecular weight polyesterdiols permit the proportions of ingredients to be varied over a broader range without sacrificing energy absorption properties over a wide temperature range. The mean penetration velocity of the steel ball is not reported for brittle samples but it is believed to be misleading for the reason that there is very litle diaphragm action with brittle samples. These brittle compositions, however, would be useful in applications where the mid range or high temperature range properties are desired, i.e., in safety glass applications where impact performance at 0° F. is not important.

The reactant molar relationship used for superior broad temperature polyesterurethane interlayer compositions is also illustrated by the accompanying drawing. Referring to that drawing, the mole ratio of 1,4-butanediol to poly(1,4-butylene adipates) of 1,000 to 2,000 number average molecular weight is graphically illustrated as a function of the poly(1,4-butylene adipate) molecular weight. There it can be seen that the range of reactant molar proportions (as evidenced by the distance between the lines) is more critical with the lower, i.e., nominal 1,000, molecular weight polyesters and less critical with the higher, i.e., nominal 2,000, molecular weight polyesters. It is also seen that the molar ratio of diol to polyester increases with increasing polyester molecular weight. The points in the drawing labeled A, B, K, J, H and D correspond to the correspondingly lettered examples in Table II. Thus, the area between the lines BH and AD of the drawing represent the range of molar proportions for the reactants 1,4-butanediol and poly(1,4-butylene adipate) of from 1,000–2,000 molecular weight that can be used, in combination with a diisocyanate, e.g., a cycloaliphatic diisocyanate, to prepare polyesterurethanes that provide excellent impact resistant glass laminates over a broad temperature range, e.g., 0° F.–120° F.

Generally, the most preferred polyesterurethane compositions employing poly(1,4-butylene adipates) of 1,000 to 2,000 molecular weight and 1,4-butanediol as the low molecular weight active hydrogen compound will have a mole ratio of 1,4-butanediol to polyester of less than about line BH of the drawing and generally superior compositions can be prepared when the mole ratio of 1,4-butanediol to poly(1,4-butylene adipate) of 1,000 to 2,000 molecular weight is between about lines BH and AD of the drawing. When a mixture of polyesters is employed, the limits represented by such lines can be extended without loss of impact properties. The molar ratio can be further extended with poly(1,4-butylene adipates) of higher molecular weight than 2,000 and the concept is applicable to ther polyesters although the exact mole ratios will vary from those illustrated.

Commercially available polyesters typically contain residual minor amounts of unreacted glycol for the reason that removal of all of the unreacted glycol without affecting the polyester is difficult. Generally, the lower the molecular weight of the polyester, the more residual unreacted glycol found in the polyester. For example, polyesters of about 1,000 molecular weight typically contain no more than 1 weight percent of the unreacted glycol used to prepare the polyester while polyesters of about 2,000 molecular weight typically contain no more than 0.5 weight percent of unreacted glycol. Since large amounts of free glycol, e.g., diol can impart more rigidity to the polyesterurethane, the aforementioned ratios are based on the use of polyesters with low amounts of free diol, i.e., the amounts conventionally found in commercially available polyesters and without added amounts of free diol.

In summary, the mole ratio of active hydrogen compound, for example, an aliphatic diol such as 1,4-butanediol, having a molecular weight less than 250 to the polyesterdiol having a number average molecular weight between 500 and about 5,000 can vary between about 0.4:1 and about 10:1, and more commonly between about 0.4 or 0.5:1 and about 7:1. For best results, when using a low molecular weight (1,000) polyesterdiol, the mole ratio of active hydrogen compound to polyesterdiol will be between about 0.4:1 and about 5:1 and more preferably between about 0.4:1 and about 1.2:1. For a higher (2,000) molecular weight polyester, the corresponding mole ratio will be between about 1.5:1 or 2:1 and about 5:1. The mole ratios will vary, however, depending upon the composition of the reactants, the reaction temperatures, mixing temperatures, configuration of the laminate and other variables mentioned herein. Generally higher ratios of the active hydrogen compound to polyesterdiol can be employed without sacrificing optimum properties when the polyesterurethane is adhered to a single sheet of glass in a bilayer configuration.

Polyesterurethanes of the present invention are capable of providing excellent impact resistance to laminated glass articles, e.g., safety glass for automobile windshields. For example, 5-pound, steel ball impact tests on a rigidly held laminate prepared from about 0.030 inch sheeting of such polyesterurethane sandwiched between two 12 × 12 × ⅛ inch sheets of glass show that such laminates can exhibit penetration resistance of at least 20 miles per hour at 0° F.–70° F. and/or 120° F. Further, such polyesterurethanes and the laminates prepared with them are not brittle at 0° F., i.e., the laminates do not exhibit brittle behavior on impact at such temperature. Some polyesterurethane compositions can exhibit penetration resistance of at least 24 miles per hour and as high as 37 miles per hour at 0° F., 70° F., and/or 120° F., depending on the particular composition, Thus, as indicated, certain polyesterurethanes can exhibit such performance at one or more of the aforesaid temperatures, e.g., 0° F. and 70° F; 70° F. and 120° F. or 0° F., 70° F., and 120° F., by proper formulation, e.g., by use of the interrelationships between the polyesterdiol molecular weight and the molar ratio of monomeric diol to polyesterdiol discussed hereinbefore.

In the case of safety glass for automobile windshields, it is also necessary to maintain concussive injury to the occupants thereof at a reasonable level while retaining simultaneously good penetration resistance over a broad temperature range. Concussive injury has been identified with a factor known as Severity Index which is discussed hereinafter. Polyesterurethanes of the present invention are able to provide both excellent penetration resistance over a broad temperature range and reasonable Severity Index (S.I.) levels, e.g., an S.I. of less than 1,000. For example, impact tests on rigidly held laminates prepared from about 0.030 inch sheeting of such polyesterurethanes sandwiched between two 12 × 12 × ⅛ inch sheets of glass show that such laminates exhibit penetration resistance corresponding to a mean penetration velocity of at least 20 miles per hour at 0° F. and at least 17 miles per hour at 120° F. for a free falling 5 pound steel ball. Preferred polyesterurethane sheet is capable of providing a mean penetration velocity of at least 24 miles per hour at 0° F. and 70° F. and at least 18, e.g., 18 to 20, miles per hour at 120° F. for a 5 pound free falling steel ball. Moreover, such penetration resistance is achieved without exceeding the injury threshold for head impacts, i.e., the Severity Index. Such results are especially significant when compared to conventional safety glass prepared with plasterized polyvinyl butyral.

Further, it has been found that the preferred polyester-urethanes can provide improved impact performance to polyvinyl butyral over a broad temperature range at thinner interlayer thicknesses. Thus, 18–22 mil thick, e.g., 20 mil thick, polyesterurethane sheet provides at least equivalent and more typically improved impact resistance than commercial 30 mil plasterized polyvinyl butyral sheeting.

In addition to impact resistance over a broad temperature range, a further important criterion of a good interlayer composition is that it be transparent at least when in the form of a thin sheet as it is used in the laminated safety glass. It has been discovered that appropriately clear (transparent) or haze-free interlayers are provided when the polyesterurethane-forming reactants are homogeneously mixed and reacted at a temperature of above about 100° C. and preferably above about 120° C. In some cases, however, additional steps are necessary in order to obtain haze-free, clear polymers. For example some compositions made from high molecular weight polyesters, such as a 4,000 molecular weight poly (1,4-butylene adipate), are translucent unless the reaction rates of the reactants are controlled to obtain a more random distribution in the polyesterurethane, such as by use of a catalyst or by mixing and/or conducting the reaction at a higher temperature.

Some polyesterurethanes are translucent when made with xylylene diisocyanate or 4,4'-methylene-bis-(cyclohexyl isocyanate) having about 70 percent of the isocyanate groups trans and about 30 percent of the isocyanate groups cis. One method that can be used to clarify these polyesterurethanes is to heat them to a temperature of between about 320° F. and about 375° F., such as by extrusion, and then quench them in water. In some cases, the translucent state may reappear upon aging. It is believed that polyesterurethanes prepared from 4,4'-methylene-bis-(cyclohexyl isocyanate) of the aforesaid steroisomer ratio are often translucent due to the fact that the larger amount of the more reactive trans isomer results in blocks of regular segments in the polyurethane which cause opacity or translucency. A third way for obtaining clear polymers with the aforesaid diisocyanates is to use an unsymmetrical low molecular weight diol as the active hydrogen compound, such as 1,3-butanediol, 1,4-cyclohexane dimethanol (mixture of cis and trans isomers) or an aromatic phenol such as Bisphenol A in place of the preferred aliphatic symmetrical diol, 1,4-butanediol. When 4,4'-methylene-bis-(cyclohexyl isocyanate) having the isocyanate groups distributed in the stereoisomer ratio of about 55 percent trans and about 45 percent cis is employed, the most preferred 1,4-butanediol can be used as the active hydrogen compound and superior, clear polyesterurethane compositions obtained. The preferred diisocyanates are those in which a similar reaction rate with each of the other polyesterurethane reactants can be achieved at the reaction temperature desired. Aliphatic and cycloaliphatic diisocyanates have nearly the same reactivity rate with the above-described polyesters and low molecular weight aliphatic diols and therefore are preferred.

Polyesterurethanes made with other diisocyanates such as toluene diisocyanate and 4,4'-methylene-bis(-phenyl isocyanate) are less preferred than those prepared with cycloaliphatic diisocyanates as these materials provide polyesterurethanes that: do not normally have as good impact energy absorption levels; are more subject to ultraviolet light degradation, such as when employed in a bilayer configuration and not protected on both sides by glass; and, are not as thermally stable and, in some cases, may be partially degraded during the forming operations so that they are somewhat restricted in the methods by which they can be treated. UV absorbers, such as 2,4-dihydroxy benzophenone and Tinuvin P (TM of Geigy Chemical Corp. for a substituted benzotriazole) are preferably employed for the aromatic diisocyanates but are generally not required for the more stable aliphatic diisocyanates. Thermal stabilizers may be required for some of the compositions such as dilauryl thiodipropionate and the hindred phenolics. The polyesterurethanes made from aliphatic and particularly cycloaliphatic diisocyanates, however, are not adversely affected by ultraviolet light nor are they adversely affected by conventional processing temperatures. For example, the most preferred polyesterurethanes prepared from poly (1,4-butylene adipate), 1,4-butanediol, and 4,4'-methylene-bis(cyclohexyl isocyanate) (Hylene W) have been studied by means of a DuPont thermogravimetric analyzer, and after 12 hours at a temperature of 200° C. show no decomposition. At a temperature of 250° C. for the same time, the polyesterurethane is decomposed at a rate of only 1.2 percent per hour. Thus, the most preferred polyesterurethanes can be processed up to temperatures of 270° C. or above for several minutes without adverse effects.

Although the better interlayer polyesterurethanes have been prepared from aliphatic polyesters having molecular weights between about 1,000 and about 4,000, good results can be achieved also with polyesters having molecular weights between about 750 and 5,000. Depending upon the type and molecular weight of the diisocyanate and active hydrogen compound of molecular weight less than 250, polyesters can be employed having molecular weights between about 500 and about 20,000 or more. When the polyester has a low molecular weight of about 500, in order to obtain the desired flexability and optical clarity, it is necessary that the quantity of active hydrogen compound be reduced to less than 1 mole per mole of polyester, such as from about one-fourth of a mole to one-half a mole of active hydrogen compound per mole of polyester. The exact proportion employed, however, will depend upon the particular ingredients and their molecular weight.

Generally the polyesters will have a number average molecular weight between about 750 and 4,000; the diisocyanates will have molecular weights between about 172 and about 300; and, the active hydrogen compound will have molecular weights between about 62 and about 250. When reactant materials are employed within the aforesaid molecular weight ranges, the resultant polyesterurethane will contain (calculated from the weight percentage of ingredients) by weight between about 40 and about 80 percent and preferably between about 50 and about 70 percent polyester, between about 10 and about 60 percent and preferably between about 20 and about 40 percent diisocyanate and, if at all, from between about 3 and about 25 and preferably from between about 5 and about 15 percent active hydrogen compound. When, however, polymers such as the polyoxypropylene diamines are employed as the active hydrogen compound, they can be employed in amounts approaching that of the polyester.

The polyesters can contain other than ester segments and they can be mixed physically with other polymers such as, for example, polyethers, polycarbonates, polyamides, polysiloxanes, polymers of unsaturated hydrocarbons, and the like, as well as mixtures of such other polymers. These other polymers should be hydroxy, amino, or mercapto terminated. The polyester, however, preferably has at least a numerical excess of

linkages over the total of any other non-hydrocarbon linkages contained therein and more preferably a numerical excess of 2:1 or more. When other polymers are employed, they can be employed in minor amounts up to about 45 percent and preferably between about 10 percent and about 30 percent by weight of the polyester. The preferred polyesterurethanes are thermoplastic and, thus, essentially linear difunctional reactants are preferred, although trifunctional reactants can be employed in minor amounts of less than about 1 percent by weight of the reactive groups and a thermoplastic polyurethane obtained. In general, thermoplastic polyurethanes are characterized by being substantially free of branching and crosslinking. They are thermoplastic because they are made essentially from difunctional reactants. Thus, the polyester, diisocyanate and active hydrogen compound (e.g., aliphatic diol) are ideally the only polyfunctional reactants employed in the preparation of the polyesterurethane.

As indicated heretofore, a key component to the polyesterurethane is an active hydrogen, e.g., hydroxyl-terminated polyester; but, a minor portion of this requisite polyester can be replaced by other polymeric components, e.g., a mixture of polyester and polyether can be used. Exemplary of suitable polyesters are the poly (oxypolymethylene) glycols, such as disclosed in Wismer, U.S. Pat. No. 3,509,015, e.g., poly(tetramethylene) glycol, polyethylene glycol, and poly(1,2-propylene) glycol.

Exemplary of suitable polycarbonates which can be employed include the hydroxy-terminated polycarbonates as disclosed in U.S. Pat. Nos. 3,248,414; 3,248,415; and 3,248,416, those prepared from ethylene carbonate and ethylene glycol; and those described in U.S. Pat. Nos. 3,215,668, 3,526,572, 3,388,032, 3,214,489, 3,379,693 and 3,639,354.

Exemplary of suitable polyamides which can be employed are: the condensation products of dibasic acids with diamines such as ethylene diamine, particularly wherein the dibasic acids are azelaic, adipic, suberic, sebacic, or dimer acids from vegetable oils such as soybean, cottonseed, and corn.

Exemplary of hydroxy-terminated polysiloxanes are, for example, linear polysiloxanes having the repeating units $\{R_2SiO\}$ wherein the R groups are organic radicals and preferably methyl or phenyl. Silicon atoms can also be incorporated into the bodies of other polyols such as polyesters and polyamides by reacting an organic chlorosilane with said polyols. By a similar method, silicon atoms can be incorporated into the low molecular weight diols.

Exemplary of suitable hydrocarbon polymers are the mercapto and hydroxy-terminated: poly(ethylene), poly(propylene), poly(butylene), poly(ethylene-propylene) copolymers, poly(butadiene), poly(butadiene-acrylonitrile) copolymers and poly(butadiene-styrene) copolymers. Most of the aforementioned polymers are commercially available but those that are not can be prepared by methods well-documented in the literature.

The polyesterurethanes can be prepared in several ways. The prepolymer method offers selective control of the polymerization steps. By this method, the polyester is first reacted with an excess of diisocyanate to give an intermediate molecular weight adduct or prepolymer. The amount of diisocyanate used is in excess of the amount required to end cap the polyester, i.e., more than 2 moles of diisocyanate per mole of polyester.

Generally, about 3 moles, preferably 4 or more moles, of diisocyanate per mole of polyester are used. The prepolymer can then be polymerized (chain-extended) with glycols, diamines, or other active hydrogen compounds. The processing conditions which can be used and the final polymer properties will govern the choice of curing agent. The prepolymer is preferably heated to a temperature which will be above the melting point of the curing agent and which will reduce the prepolymer viscosity to a few hundred or at most a few thousand centipoises so as to aid in mixing and prevent solidification of the curing agent. The curing agent is usually heated above its melting point also. The mixing of the prepolymer with curing agent is a critical step and the agitation should be excellent. A thermo-setting or cross-linked material can be obtained by the use of some triol or other trifunctional material in the curing step or crosslinks may be obtained by regulating the ratio of prepolymer to active hydrogen compound so that a slight excess of unreacted isocyanate is present.

In addition to the prepolymer route where the reaction of the isocyanate reactant with the polyester reactant is completed before the active hydrogen compound (alternatively referred to herein as "curing agent") is added, all components may be mixed simultaneously in a so-called "one-step" process and reacted at, for example, temperatures of from 65° C. to 180° C. This method is generally satisfactory if the heat of reaction is properly controlled and if the relative rates of reaction of all of the reactants are nearly the same such as when all contain hydroxyl groups as the only reactive sites. Otherwise, a catalyst must be employed. For example, when a diamine active hydrogen curing agent is included, the one-step procedure is usually successful only if special catalysts are added to selectively catalyze the reaction of the hydroxyl groups so that their reactivity becomes similar to that of the amine groups. Otherwise, the diamine reacts first forming a polyurea which separates from the reaction mixture.

Suitable urethane-forming catalysts are those materials that are specific for the formation of urethane structure by the reaction of the —NCO group of the diisocyanate and —OH group of the polyesterdiol and low molecular weight active hydrogen compound, and which have little tendency to induce side reactions leading to allophanate and isocyanurate formation. For these reasons, catalysts such as organo-tin compounds are preferred. Illustrative catalysts include: stannous octoate, stannous oleate, dibutyl tin diacetate, butyl stannoid acid, dibutyl tin diacetate and dibutyl tin dilaurate. The amount of catalyst used in any particular system can be determined routinely by one skilled in the art. Amounts of from about 0.0005–0.02 parts of catalyst for one hundred parts of the polyesterurethane-forming ingredients can be used. The amount of catalyst needed, of course, depends on the curing temperature used. Catalysts other than the preferred tin catalysts that are useful for the formation of urethanes can, of course, be used.

The properties of the polyesterurethanes are governed by a number of characteristics such as molecular weight, crosslinking, inter-molecular forces, stiffness of chain units, the ease of rotation of chain segments and crystallization. These variables can be changed, however, to design polymers with specific properties. The polyurethane or polyurethane urea segments formed from the low molecular weight active hydrogen compounds are believed to exist in domains which provide stiffness to the polymer and the polyester and other polyol segments provide flexibility. The structure and length of the hard segment, which is derived from the low molecular weight active hydrogen compound and diisocyanate, may be controlled by the amount and type of reactants employed. Similarly, the structure and length of the flexible segment can be controlled by the molecular weight and type of hydroxyl-containing polyester used.

Although not intending to be bound by the following explanation; it is believed that the unusual energy absorption properties and transparency of the herein described polyesterurethanes are not only dependent upon the polyurethane reactants and proportions but on the method of preparation. More particularly, it is believed that the presence of regular polyurethane block segments adversely bears upon the transparency and energy absorption properties of the polyurethane. Consequently, it is believed that a random polymer is necessary for optimum results. Whether or not the polyurethane contains random or regular block segments, however, depends in part upon the particular reactants and their relative reactivity as well as the conditions of reaction. Generally speaking, the diisocyanate is believed to be more reactive with the low molecular weight active hydrogen compound than the hydroxy-terminated polyester; and, hence, care is required to inhibit the preferential reaction between the active hydrogen compound and the diisocyanate. This can be attained in part by raising the temperature of the reactant mixture to the reaction temperature quickly.

Preferably the reactant mixing temperature is at least about 80° C. when no catalyst is employed. Thereafter, when the initial mixing exotherm has subsided, the reaction mixture is maintained at a temperature of at least about 120° C. When a catalyst is employed, the reactant mixing temperatures will generally be lower, such as about 65° C. so that the initial mixing exotherm does not carry the temperature of the reaction mixture substantially above the reaction temperature desired. Inasmuch as polyesterurethanes are thermally stable, reaction temperatures as high as 180° C. can be used. When a catalyst is employed, lower reaction temperatures, e.g., as low as about 65° or 70° C., can be employed because the catalyst accelerates the reaction. When a catalyst is used, a preferred reaction temperature range is between about 80° C. and about 100° C or 110° C. When no reaction catalyst is employed, the reaction temperature is preferably between about 120° C. and 150° C. after the exotherm has subsided.

It has also been found that it is important to rapidly attain the desired reaction temperature after a homogeneous reactant mixture is obtained when a catalyst is not employed so that the polymer does not become hazy. The procedure of Example I is exemplary of that suitable for attaining rapidly the reaction temperature. For example, it has been found that when the preferred reactants, i.e., poly (1,4-butylene adipates), 1,4-butanediol and cycloaliphatic diisocyanates such as 4,4'-methylene-bis(cyclohexyl diisocyanate) are employed, the reactant mixture becomes hazy after about 103 minutes at a temperature of 65° C. When the temperature is raised to 80° C., however, the mixture becomes hazy after about 47 minutes and when the mixture is slowly raised from 57° C. to 100° C. over a 20 minute period and then held at 100° C., the mixture is hazy after only 16 minutes at 100° C. High molecular weight polyesters require more vigorous agitation and- /or higher reaction temperatures in order to obtain a homogeneous reactant mixture and a resultant transparent polyurethane because of their high viscosities. The aforementioned preferred polyurethanes are preferably prepared by the one-step bulk polymerization method which provides a flexible polymer having a more random distribution of segments.

The urethane-forming reactants are preferably mixed under moisture-free, i.e., anhydrous, conditions to prevent moisture contamination. For example, mixing and reaction can be conducted under a nitrogen atmosphere at atmospheric pressure and at a temperature between about 70° C. and about 180° C. until the polyurethane formation is essentially complete and the product is substantially free of isocyanate groups. The polyester and other water-absorbing reactants should not have a water content higher than about 0.06 percent when the isocyanate to hydroxyl molar reactant balance (NCO-/OH) is 0.99. When the reaction is conducted without a catalyst, an oxygen-free atmosphere is also preferably employed to prevent surface discoloration of the polyurethane.

More particularly, to obtain the randomness desired in the polymer structure and a clear leathery polymer, the active hydrogen compound, e.g., 1,4-butanediol, is preferably added to the polyester under a nitrogen atmosphere to exclude moisture and the mixing temperature maintained sufficiently high so that there is no phase separation and a homogeneous reactant mixture is obtained. The diisocyanate, e.g., 4,4'-methylene-bis(cyclohexyl isocyanate), is then preferably added rapidly to the homogeneous mixture and the temperature of the resulting mixture maintained above about 65° C. (although higher temperatures will be required for materials which are sparingly soluble) so that there is no phase separation and the total reactant mixture remains homogeneous. The mixture is then preferably degassed with agitation for a period, for example, of about 3 minutes, during which time the pressure is reduced from atmospheric to about 3 millimeters of mercury. The reduction in pressure facilitates the removal of the dissolved gases such as nitrogen and carbon dioxide, and then the ingredients are preferably reacted in a polymerization oven at between about 120° and 150° C. (e.g., 143° C) in the absence of a urethane-forming catalyst and the reaction continued until there are substantially no free isocyanate groups, e.g., ½ hr.–48 hours, more typically 2–24 hours. In the absence of a catalyst, the reaction is generally conducted for at least about 10 hours, and preferably under a nitrogen atmosphere.

After the polyurethane reaction is substantially complete, the resultant solid polyurethane is cut preferably while warm, granulated and transferred directly to an extruder and extruded and/or milled and calendered into sheets of the desired thickness. Alternatively, the partially polymerized material can be transferred to and further polymerized in the forming equipment. When it is not possible to make a direct transfer from the reaction apparatus to the forming apparatus, the polyurethane material can be poured into coated trays and the like and allowed to harden into blocks. Suitable coating materials for such trays are fluorinated polymers, such as Teflon, and sheet material such as Tedlar or carnauba wax. Conventional granulators, rubber mills and extruders can be employed to form the polymer into sheet form. The polyurethane sheet material is then preferably sandwiched between a non-adhering protecting material such as polyethylene to exclude dust and preferably sealed in a container to exclude moisture. It may be desirable to coat the polymer with a powder, such as sodium bicarbonate, in order to prevent adjacent sheets from adhering to each other. Before assembling the sheets into glass laminates, it is desirable to control the moisture content of the polyurethane such as by drying it in an oven at a temperature of between about room temperature, e.g., 68° F., and about 120° F. for from a few hours up to about 3 days or more. Before lamination, the powder, if employed, can be removed in a water bath and the sheet dried. The polyurethane can then be placed with other materials to form the desired laminate.

In some cases, an adhesion promoter such as the alkoxy silanes, may be necessary when laminating the polyesterurethane to glass. Suitable adhesion promoting materials include: gamma-aminopropyltriethoxysilane, sold by Union Carbide Corporation under the trademark "A-1100" and Dow Corning under the trademark "Z-6020"; and N-(beta-aminoethyl)gamma-aminopropyltrimethoxysilane sold by Union Carbide Corporation under the trademark "A-1120". The promoter can be incorporated into the urethane forming reactants, applied externally to the polyurethane sheet material, or applied to the glass surface. In some cases, use of an adhesion controlling agent or inhibitor, such as the alkyl acid phosphates disclosed in Canadian Pat. No. 860,469, may be necessary. Particularly preferred is stearyl acid phosphate which has been observed to effect the desired adhesion control with excellent diaphragm action and glass retention on the polyurethane when a laminate is broken. It has been found further, that when laminates are prepared by the cast-in-place method an adhesion inhibitor is necessary for the reason that this preparative method produces laminates in which the polyurethane is quite strongly adhered to the glass. The adhesion inhibitors are generally added to the urethane reactants although in some cases they may be coated on the polyurethane sheet material or glass sheet. Only a minor amount of adhesion controlling agent is required, if at all, such as from about 0.00001 to about 0.1 weight percent.

The polyesterurethanes generally have inherent viscosities at 30° C. in 0.5 percent solution of stabilized chloroform or N-methyl-2-pyrrolidone of between about 0.3 and 3.0 deciliters/gram (dl/g). The preferred polyesterurethanes have inherent viscosities of between about 0.8 and about 1.6 dl/g. It has been found that the higher the urethane intent of the polyurethane, the higher the molecular weight required for improved performance at 0° F. The most preferred polyurethanes, i.e., those prepared from polybutylene adipates, cycloaliphatic diisocyanates and aliphatic diols, generally fall within the preferred range.

Polyurethanes have also been characterized by their urethane (HNCOO) concentration. For example, based upon 1 mole of any polyester polyol and an NCO:OH ratio of 1, the quantity of monomeric diol and diisocyanate, the urethane content of the polyurethane can be determined by the expression:

$$Wu = \frac{(1 + x \text{ moles low MW diol}) \; 118}{(\text{MW low MW diol})(x) + (\text{MW diisocyanate})(x+1) + \text{MW polester polyol}} \times 100$$

where Wu = weight percent of urethane group; and MW = molecular weight

The preferred polyesterurethanes will generally have a Wu of from about 10 to about 20 percent, by weight, more preferably from 12 to 17.5 percent and most preferably from 13 to 15 percent. For example, particularly useful polyurethanes prepared with a polyester having a molecular weight of 1,000 will have a urethane content of between about 14 and about 15.5 percent by weight. Similarly, polyurethanes prepared with polyester polyols of 2,000 molecular weight will have a urethane content of between about 12 and 17.5 percent by weight, with an optimum of about 13.7 percent by weight.

The preferred urethanes of the invention can be characterized as plastomers, that is, they are elastoplastic and thus do not snap back as a true elastomer when stressed. In addition, they are optically clear when used in laminates in thin sections, e.g., from 10 to 60 mils, flexible and essentially non-adhesive at room temperature. They can also be described as being leathery, thermoplastic polymers that generally have a relatively constant Gehman modulus at between about $-20°$ C. and $50°$ C. of $1 \times 10^7$ and $1 \times 10^{9.5}$. Gehman modulus is the log of the product 3 (shear modulus expressed in dynes per cm.$^2$), as measured according to ASTM-D 1053-65. The Gehman modulus should be taken within a few days or not more than a month after the polyurethane sheet is formed as the Gehman modulus may change upon aging. They are resistant to shock and impact and, when incorporated as part of a laminated window, e.g., a glass laminate, impart penetration resistance to the laminate over a wide temperature range. This property is important for safety glass applications.

The preferred polyesterurethanes, as indicated, are prepared in a manner such as to obtain a random distribution of segments. For example, all the reactants are reacted simultaneously, i.e., the one-step bulk polymerization method, and the reactants are chosen or a catalyst used to impart substantially equal reactivities to the reactants. Consequently, the polyesterurethane will have a random distribution of hard and soft segments. The concept of hard and soft segments is known in the polyurethane art. See for example U.S. Pat. No. 3,422,066 and 3,541,053. The segmented polyesterurethanes can be characterized by the general formula,

A+~AB—BA+;~AB—BA+AB—BA+,AB—B

|←—Soft Segment—→|←—Hard Segment—→| wherein:
A ~ A represents the polyester diol and A represents the hydroxyl (—OH) group; A—A represents the low molecular weight active hydrogen compound, e.g., the aliphatic diol; B—B represents the diisocyanate and B the isocyanate (—NCO) group, and AB represents the urethane

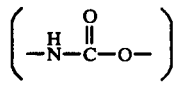

linkage. z and y represent the number of the indicated units present in the polyesterurethane.

Thus, the simple segmented polyesterurethanes of the present invention are composed of two segments: (a) a hard segment which is composed of the reaction product of the low molecular weight active hydrogen compound, e.g., the aliphatic diol, and the diisocyanate (b) a soft segment which is composed of the reaction product of the polyesterdiol and the diisocyanate. The hard and soft segments are bonded together through urethane linkage. Generally, the higher the molecular weight of the polyesterdiol, the higher the weight percent hard segment of the polyesterurethane. The preferred polyesterurethanes of the present invention and those that are useful for the preparation of penetration (impact) resistant glass laminates will have a weight percent hard segment of from about 15 to about 45 percent, preferably from 20 to 36 percent. More particularly, when the polyesterdiol has an average molecular weight of about 2,000, the hard segment of the polyesterurethane will range preferably from about 25 to about 33 percent. The weight percent hard segment (H. S.) can be calculated from the expression:

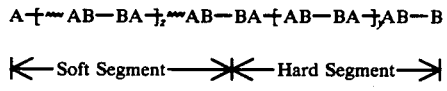

wherein A—A and B—B are as defined above.

The preferred polyesterurethanes of the invention are amorphous and will generally have an average molecular weight, as calculated from inherent viscosity measurements, of between about 10,000 and about 100,000 and preferably between about 20,000 and about 65,000. The optically clear, thermoplastic polyesterurethanes upon heating will generally exhibit an enthalpic transition at about $70°$ C. and generally no transitions occur between $100°$ and $170°$ C., which indicates that the polymer is amorphous. These transitions can be ascertained by differential thermal analysis using a duPont 900 differential thermal analyzer. Softening points of about $140°$ C., are typical. The preferred polyesterurethane compositions suitable for use in automobile windshields meet the standard requirements of minimum light transmission of 70 percent and usually will be 86.5 percent or above (Illuminant A, Tungsten Lamp 2,840° F) and less than 2 percent haze on an abraded specimen (ANSI Code Z-26.1, 1966, Test No. 18). The percent light transmission and percent haze can be measured by the Hunter Pivotable Sphere Haze Meter.

Although the polyesterurethane compositions of the present invention can be employed in laminates with other materials such as polyvinyl butyral, polycarbonate, and the like, this is not preferable because, as a general rule, for every added unlike material there is a decrease in the clarity and optical properties of the laminate. Further, materials such as Bisphenol A polycarbonates are extremely rigid such that concussive injury is more likely if such materials are used in multiply laminates. Thus, a principal advantage of the invention is the discovery that particular class of polyesterurethanes can be employed as the sole or main interlayer between two glass surfaces or adhered to a single layer of glass to make a glass laminate having good optical properties and superior properties for minimizing human injury.

After all the air has been removed from the glass-interlayer innerface by prepressing, the prepressed glass-interlayer glass assemblies are then introduced into an oil or air autoclave or other suitable high pressure equipment and heated to a temperature of about $250°$ F. to $375°$ F. and at a pressure between 50 and 250 pounds per square inch for about 45 minutes to 2 hours to laminate the assembly. Autoclave conditions will depend upon the particular polyesterurethane employed. Pressures of about 200 pounds per square inch at 275°–300° F. for 45 minutes are typical. The temperature of the oil is then reduced to about 150° F., the pressure is released and the laminated assembly removed from the autoclave.

A method for preparing a cast-in-place trilayer glass laminate is taught by Wismer et al, U.S. Pat. No. 3,509,015. By this method, two plies of glass which have been previously formed (if desired) are placed upon one another and spacers such as tape are placed around the perimeter. The glass plies are thus separated so that the liquid polymer can be poured between the plies to achieve the desired thickness and the urethane polymer cured. Preferably, however, the compositions of the invention are extruded and/or calendered to obtain better uniform stress-free sheets. If a bilayer is desired by the cast-in-place method, one layer of glass can be treated with a release agent such as a polysiloxane, Teflon and the like, and the layer removed after the other layer of glass and urethane are bonded together. Where the width of the interlayer is not critical, a bilayer can be prepared by spraying the liquid urethane polymer on a single layer of glass and heating the laminate. When it is desired to prepare a bilayer using the extruded and/or calendered material, a trilayer can be prepared in which one layer of glass is preferably treated with a release agent as above and one sheet of glass removed. A pressure plate of glass or like material also can be employed to adhere the urethane sheet to a single sheet of glass.

To fabricate safety glass laminates of the invention, laminating can be conducted also with the preformed polyesterurethane sheet. Laminating with a preformed sheet is conducted in two stages, i.e., a first "prepressing" stage and a second "autoclaving" stage. The prepressing stage can be performed using rubber tubing edge channels, as described in U.S. Pat. No. 2,948,645. In this method, a matching pair of thin glass sheets are assembled with the preformed polyesterurethane sheet therebetween to form a sandwich structure. The sheets of glass can either be annealed or tempered.

After the sandwich structure has been assembled, a rubber channel is fitted around the marginal edge of the sandwich and connected to a vacuum source. The prepressing operation is performed at a temperature of about 225° F. to 300° F. for about 10 to 15 minutes using a vacuum of about 26 to 28 inches of mercury. This prepressing operation removes air between the plies of glass and the interlayer material, thus permitting subsequent lamination to take place without the development of air bubbles at the glass-polyesterurethane surface. Another method of prepressing involves using modification of the so-called "vacuum bag technique" as generally described in U.S. Pat. No. 3,311,517. In this method, the sandwich construction is placed in a plastic bag, for example, a silicone rubber bag, which is inserted in an oven. With the exception of an air exhaust valve, the bag is then sealed to form an air-tight closure. The bag is evacuated through the air exhaust valve for from about 5–10 minutes at a vacuum of about 25 to 28 inches of mercury. Temperature of the oven is then increased to about 300° F. and the temperature and vacuum held from 7 to 10 minutes to prepress the samples.

After all the air has been removed from the glass-interlayer innerface by prepressing, the prepressed glass-interlayer glass assemblies are then introduced into an oil or air autoclave or other suitable high pressure equipment and heated to a temperature of about 250° F. to 375° F. and at a pressure between 50 and 250 pounds per square inch for about 45 minutes to 2 hours to laminate the assembly. Autoclave conditions will depend upon the particular polyesterurethane employed. Pressures of about 200 pounds per square inch at 275°–300° F. for 45 minutes are typical. The temperature of the oil is then reduced to about 150° F., the pressure is released and the laminated assembly removed from the autoclave.

The following discussion is illustrative of a method by which a windshield bilayer laminate having a single layer of glass can be prepared.

Blank polyurethane sheets of rectangular shape sufficiently large to be trimmed to the shape of a windshield and of substantially uniform thickness are cut and stored for fabrication into bilayer windshields.

A release agent is prepared as follows: a supply of organopolysiloxane glass resin sold by Owens Illinois under the designation 01-650 is pulverized and 200 grams of this powdered organopolysiloxane is dissolved in 575 cubic centimeters of anhydrous n-butanol. The mixture is stirred at 200 revolutions per minute for approximately one to one and one-half hours at room temperature to completely dissolve the organopolysiloxane in the n-butanol. The resulting solution is then filtered under vacuum in a Buchner funnel using number 3 filter paper. This 30 weight percent solution is stored in a polyethylene bottle.

A pair of glass sheets of matching curvature conforming to the shape of the desired windshield is selected. One of the glass sheets in the pair is seamed to provide a beveled edge around its entire periphery. This produces a peripheral passage extending obliquely inward from the edge surface to the convex curved major surface of the seamed glass sheet to permit easy removal from the other glass sheet.

An adhesive-promoting composition consisting essentially of a solution of gamma-amino propyltriethoxysilane (Union Carbide Corporation "A-1100") is dissolved in anhydrous n-butanol in a 0.3 percent by volume concentration. The solution is filtered through number 3 filter paper in a Buchner funnel under vacuum, diluted and poured over the convex surface of the glass sheet to be used as the mold.

The release agent solution of 30 percent solids is diluted with additional n-butanol to a 15 percent by weight concentration, filtered through number 3 filter paper under vacuum, degassed until bubbling ends and applied to the convex surface of the seamed glass sheet. The glass sheet so coated is dried for 30 minutes at room temperature and then cured for 24 hours at 250° F. in a clean oven. After cooling, a tape of polytetrafluoroethylene, such as that sold under the trademark Teflon by the E. I. duPont de Nemours Co., is applied over the edge surface and over the beveled portion extending from the edge of the seamed glass sheet and folded over about a 3/16 inch wide frame adjacent the edge along the opposite surface of the glass sheet.

Another adhesive promoter consisting essentially of N-(beta-amino ethyl)gamma-aminopropyl-triemethoxysilane (Union Carbide Corporation A-1120) is dissolved in a 50 percent by weight isopropanol, 50 percent water solution in a 1 percent by weight concentration. The solution is wiped onto the concave surface of the glass sheet to be included in the bilayer windshield and dried for approximately 10 minutes at room temperature.

An assembly is then formed comprising the seamed glass sheet, the preformed polyesterurethane sheet and the other glass sheet to be laminated to the polyesterurethane sheet. The sheets in the assembly are oriented so that one surface of the polyesterurethane sheet faces the surface of the glass sheet treated with the adhesive-promoting composition and the opposite surface of the polyesterurethane sheet faces the seamed, coated surface of the mold formed of the glass sheet coated with the Owens-Illinois OI-650 glass release agent resin.

The assembly is wrapped in plastic and the plastic-wrapped assembly inserted in a "Polymar" bag of the type disclosed in U.S. Pat. No. 3,311,517 to Leroy D. Keslar and John Rankin. The bag comprises an outer ply of polyethylene glycol terephthalate (duPont Company Mylar) and an inner ply of polyethylene bonded thereto. The bag is inserted within a second bag of the same material and the unit evacuated and sealed. The sealed unit is placed in an oil autoclave and subjected to a pressure of 200 pounds per square inch at 275° F. for 45 minutes. The unit is then cooled to room temperature while maintaining an elevated pressure. The pressure is then reduced.

The assembly is removed from the autoclave and the bags and plastic wrapping removed from the assembly. The resulting assembly is placed with its concave side up on a support cart and a razor blade is driven into the peripheral passage formed by seaming the margin of the mold between the tape and the polyurethane sheet to enlarge the passage. A circular tool similar to a pizza cutter is inserted in the opening and the tool is run around the edge of the assembly along the tape to enlarge the peripheral opening around the edge. After completing edge separation to a depth of about one inch, the mold is pried off the bilayer by hand, using a vacuum holder to engage the outer glass ply of the bilayer windshield.

The resulting bilayer windshield has an exposed polyurethane surface that is smooth and free of surface markings inside the frame along which the pizza cutter was applied to enlarge the peripheral passage between the mold and the bilayer windshield. Further, the bilayer windshield has excellent optical properties and is clear and exhibits excellent transmission to visible light.

The glass which can be employed in the invention can be of any type depending upon the intended use for the laminate; but, preferably is a clear, low colored, transparent type of glass including soda-lime, silica and alumino-silicate glasses; thermally tempered glasses such as Herculite K glass marketed by PPG Industries, Inc., Tuflex glass marketed by Libbey-Owens-Ford Glass Company; chemically strengthened glasses, such as Chemcor marketed by Corning Glass Works, and Herculite II, marketed by PPG Industries, Inc.; tinted glasses such as Solex marketed by PPG Industries, Inc., etc. The most preferred glasses, however, for use in safety glass laminates are the thin (approximately 3/32 - 1/8 inch thick glasses.

Of particular interest are the glass compositions which are specially formulated by ion-exchange techniques. Such glasses are described, for example, in U.S. Pat. No. 3,357,876. The glass can be made by commercially well-known processes, such as, for example, the float process as described in U.S. Pat. No. 3,083,551, the Pittsburgh Process, also known as the Pennvernon Process (registered trademark of PPG Industries, Inc.), to make sheet glass as described in U.S. Pat. Nos. 1,833,379, 1,833,380, 1,833,381 and 1,833,382 and the Continuous Plate Process for making plate glass as typically described in U.S. Pat. Nos. 2,478,090 and 2,505,103.

A soda-lime-silica glass made by the float process is preferred because it has the best combination of optical quality coupled with economic production cost, currently known. Such glass will have the following typical analysis: $Na_2O$, 10–15 percent by weight; $K_2O$, 0–5 percent by weight; CaO, 5–15 percent by weight; $SiO_2$, 65–75 percent by weight; MgO, 0–10 percent by weight; $B_2O_3$, 0–5 percent by weight; $Al_2O_3$, 0–1 percent by weight and $Fe_2O_3$, 0–1 percent by weight.

In addition to vehicle windshield, glass laminates using the herein described polyesterurethanes can be prepared for shower stalls, doors — both sliding and fixed — or any glass barrier particularly where accidents to humans or animals are possible.

For automobile and other vehicle windshields, the glass will preferably have a thickness of between about 0.065 inch and 0.180 inch. When a trilayer is employed, the outer layer can be thicker than the inner layer but preferably they are the same or about 1/8th inch in thickness. Although the thickness of the polyesterurethane interlayer can vary between about 5 mils and 120 mils or more, it is preferably between about 15 and about 45 mils, e.g., about 30 mils, for automobile windshields in order to obtain maximum transparency, low haze, and good diaphragm action when impacted. It has been found further that the preferred polyesterurethanes of the present invention can be used in automotive safety glass applications at thicknesses of between about 15 and 22 mils, e.g., 18 and 20 mils, and achieve improved impact resistance performance at 0° F. and 120° F. and at least substantially equivalent performance at 70° F. vis a vis conventional commercial safety glass prepared with 30 mil thick plasticized polyvinyl butyral.

The polyesterurethane should also be of a substantially uniform thickness across the entire sheet to avoid differences in diffraction. The thickness variation from edge to edge should be no more than ± 5 mils, preferably no more than ± 2 mils. Analogous, but more important than edge-to-edge change in thickness, is the rate of change in thickness. If the polyurethane has a variation in thickness and a rate of change in thickness sufficient to produce a diopter of 0.006 and above, visible optical distortion due to variations in refraction will be observed. Therefore, the polyurethane from edge-to-edge should be of substantially uniform thickness having at every surface portion a diopter of less than 0.006.

The polyesterurethane should have abrasion resistance as measured by A.N.S.I. Code Z 26.1 Test No. 18 for plastics, of no more than 15 percent increase in haze after 100 Taber cycles on a Taber abraser. For flexibility, the polyurethane should have a tensile strength of at least 1000 pounds per square inch, preferably 2000 to 8000, e.g., 2000–5000, pounds per square inch, as measured by A.S.T.M. D-638-64T. For adherence, the polyesterurethane should laminate to the strengthened glass sheet with a bond strength of 4 to 12, preferably 4 to 8, pounds per lineal inch as measured by the 90° Peel test described in NASA Tech Brief 65-10173 or the 180° Peel test according to a slightly modified A.S.T.M. D-1876-61T procedure. The modification to the A.S.T.M. procedure consists of imposing a stainless steel wire screen in the exposed surface of the polyurethane. The purpose of the screen is to prevent the polyurethane from stretching as it is peeled from the surface.

The glass laminate bilayer structure of strengthened glass and a polyesterurethane ply, should have certain physical properties in the combined laminated configuration, particularly when the laminated structure is used as a vehicle closure. Minimum standards for motor vehicle glazing are determined in accordance with the procedures described in the A.N.S.I. Code Z 26.1 tests. Therefore, the laminated bilayer structures contemplated by this invention have the following physical properties when tested according to the procedure set forth in the A.N.S.I. Code Z 26.1 test.

Properties of Bilayer Laminates
Prepared as Contemplated by the Invention

| A.N.S.I. Code Z 26.1 Test Number | Property Measured | Result |
|---|---|---|
| 1 | Light Stability | Samples are unaffected[1] by 117 hours exposure to ultraviolet light |
| 2 | Luminous Transmittance | 70% |
| 9 | Impact Strength (Dart) | No penetration |
| 12 | Impact Strength (ball ½ pound) | No penetration |
| 15 | Optical Deviation and Distortion | Not observable at specified normal angle of incidence |
| 26 | Penetration Resistance[2] | No penetration |

[1]Samples did not visibly yellow nor lose visible transmittance.
[2]Test slightly modified by clamping the bilayer structure to the frame when the plastic side was impacted.

The following Examples will serve to illustrate the invention and preferred embodiments. All parts and percentages in said Examples are by weight unless indicated to the contrary.

EXAMPLE 1

A poly(1,4-butylene adipate) polyester (785.6 grams, 0.400 mole) having a molecular weight of about 1965, a hydroxyl number of 57, a liquidus temperature of $>59.8° \leq 60.8°$ C. and an acid number of 0.5; and a poly(1-4 butylene adipate) polyester (707.4 grams, 0.698 mole) having a molecular weight of about 1014, a liquidus temperature of $>55° \leq 55.9°$ C., a hydroxyl number of 111 and an acid number of 0.5 were dried together with agitation in a glass reactor to remove trace amounts of water by heating to 100°-105° C. under 3 millimeters of mercury pressure for about 3 hours. The pressure was released while introducing pre-purified nitrogen and anhydrous 1,4-butanediol, 260.6 grams, (2.892 moles, 0.03% H$_2$O) was added over a one minute period to the agitated mixture of dried polyesters at 93° C., and the mixture heated to 95° C. in 15 minutes. The resulting mixture was homogeneous. To this homogeneous mixture was added over a one minute period 1046.8 grams (3.989 moles) of 4,4'-methylene-bis(cyclohexyl isocyanate) (Hylene W) with a stereoisomer content of 19 to 21 percent trans, trans, 17 to 18 percent cis, cis, and 62 to 64 percent cis, trans, containing between 0.27 percent and 0.40 percent monoisocyanate, and containing 0.280 gram (0.01 percent of the total reactants) of dibutyltin dilaurate catalyst. The butanediol and diisocyanate were at 22° C. and the additions were both made while the reactor was under a nitrogen atmosphere. The resulting mixture was rapidly agitated for about one minute during which time the temperature of the mixture rose from 80° C. to 95° C. The mixture was poured into a dry Teflon coated reactor which was closed and placed in a 130° C. non-circulating oven continuously purged with nitrogen (the temperature of the polymer was approximately 143°C.) for about 2 hours until the reaction and polyurethane formation was substantially complete.

The isocyanate (NCO) content of the resulting polymer was 0.07 percent by weight as determined by infrared spectrometry. The semi-solid polymer was allowed to cool to room temperature, removed, cut and milled front roll 180° F. and rear roll 135° F.) and calendered on a 3 roll mill (top roll 250° F., middle roll 225° F. and bottom roll 215° F.) into 35 mil sheets 14 inches in width. The polymer had an inherent viscosity at 30° C. at a 0.5 percent concentration in N-methyl-2-pyrrolidone of about 1.40 deciliters/gram (dl/g) before milling. The inherent viscosity after calendering was approximately the same (1.41 dl/g).

EXAMPLE 2

In accordance with the general procedure and conditions of Example 1, a poly(1,4-butylene adipate) polyester (2.274 moles) having a molecular weight of about 1010, a liquidus temperature of $>55° \leq 55.9°$ C., and a hydroxyl number of 111.1 was mixed with a poly(1,4-butylene adipate) (1.295 moles) having a molecular weight of about 1965, a liquidus temperature of $>59.8° \leq 60.8°$ C., and a hydroxyl number of 57.1. To the agitated mixture of dried polyesters was added first 7.23 moles of 1,4-butanediol and then 9.99 moles of 4,4'-methylene-bis(cyclohexyl isocyanate) (Hylene W) and the mixture was heated to 80° C. No catalyst, however, was present and the homogeneous mass was heated in an oven at an oven temperature of between about 122° and 129° C. for 19 hours. The resultant polymer had an inherent viscosity at 30° C. at a 0.5 percent concentration in N-methyl-2-pyrrolidone of about 0.79 dl/g, and an isocyanate (NCO) content of 0.1 percent by weight. The inherent viscosity remained unchanged after calendering. The front roll temperature of the mill was 180° F. and the rear roll 135° F. The top roll of the calendar was 150° F., the middle roll 135° F., and the bottom roll 125° F.

In Examples 3 through 18, the polyesterurethanes were prepared from the specified materials following the general procedure and conditions of Example 1 except that no catalyst was used (except when indicated). Inherent viscosities of the polyesterurethanes were taken at 30° C. at a 0.5 percent concentration in N-methyl-2-pyrrolidone and the isocyanate (NCO) content of the polymer was determined by infrared spectrometry. Inherent viscosity values are reported as deciliters/gram.

EXAMPLE 3

1 mole poly(1,4-butylene adipate); No. average molecular weight (M.W.)— 1014; Hydroxyl No. (OH No.) — 110.7; Acid No. —0.5; liquidus temperature — $>55.0° \leq 55.9°$ C 0.905 mole of 1,4-butanediol 1.905 moles Hylene W cycloaliphatic diisocyanate Reaction time: 19 hours at an oven temperature of 130° C.; Inherent Viscosity (Inh. V.) — 1.21; isocyanate content (NCO) — 0.1%.

EXAMPLE 4

1 mole poly(1,4-butylene adipate); M.W. — 1965; OH No. — 57.1; Acid No. — 0.5; liquidus temperature $>59.8° \leq 60.8°$ C.

3.26 moles 1,4-butanediol
4.26 moles Hylene W cycloaliphatic diisocyanate
Reaction time: 24 hours at an oven temperature of 130° C.; Inh. V. — 0.78; NCO — 0.03%.

EXAMPLE 5

1 mole poly(1,4-butylene adipate); M.W. — 1965; OH No. — 57.1; Acid No. — 0.5; liquidus temperature >59.8°≦60.8° C.
2.34 moles of 1,4-butanediol
3.34 moles of Hylene W cycloaliphatic diisocyanate
Reaction time: 19 hours at an oven temperature of 130°–131°C.; Inh. V. — 1.03NCO — 0.07%.

EXAMPLE 6

1 mole poly(1,4-butylene adipate); M.W. — 1965; OH No. — 57.1; Acid No. — 0.5; liquidus temperature > 59.8°≦60.8° C.
3.40 moles 1,4-butanediol
4.40 moles Hylene W cycloaliphatic diisocyanate
Reaction time: 23¾ hours at an oven temperature of 129°–130° C., Inh. V. — 1.06; NCO — 0.1%.

EXAMPLE 7

1 mole poly(1,4-butylene adipate); M.W. — 1965; OH No. — 57.1; Acid No. — 0.5; liquidus temperature >59.8°≦60.8° C.
311 moles 1,4-butanediol
4.11 moles Hylene W cycloaliphatic diisocyanate
Reaction time: 19.5 hours at an oven temperature of 128°–130° C., Inh. V. —0.84; NCO — 0.03%.

EXAMPLE 8

1 mole poly(1,4-butylene adipate); M.W. — 1965; OH No. — 57.1; Acid No. — 0.5; liquidus temperature >59.8°≦60.8° C.
2.71 moles 1,4-butanediol
3.71 moles Hylene W cycloaliphatic diisocyanate
Reaction time: 19 hours at an oven temperature of 130°–131° C., Inh. V. — 0.88; NCO — 0.03%.

EXAMPLE 9

1 mole poly(1,4-butylene adipate); M.W. — 1965; OH No. — 57.1; Acid No. — 0.5; liquidus temperature > 59.8°≦60.8° C.
3.26 moles 1,4-butanediol
4.26 moles Hylene W cycloaliphatic diisocyanate
Reaction time: 20 hours at an oven temperature of 130° C.; Inh. V. — 1.02; NCO — 0.1%.

EXAMPLE 10

1 mole poly(1,4-butylene adipate); M.W. — 1965; OH No. — 57.1; Acid No. — 0.4; liquidus temperature > 59.8°≦60.8° C.
3.61 moles 1,4-butanediol
4.61 moles Hylene W cycloaliphatic diisocyanate
Reaction time: 18 hours at an oven temperature of 130° C.; Inh. V. — 0.72; NCO — 0.07%.

EXAMPLE 11

1 mole poly(ethylene adipate); M.W. — 1902; OH No. — 59.0; Acid No. — 0.3; liquidus temperature >62°≦63° C.
3.51 moles 1,4-butanediol
4.51 moles Hylene W cycloaliphatic diisocyanate
0.01% dibutyltin dilaurate
0.6 pph Irganox 1093, Geigy Chemical Corp. TM for multifunctional hindered phenols
Reaction time: 43 hours at an oven temperature of 128° C.; Inh. V. — 0.84 (determined in dimethyl formamide, DMF); NCO — 0.2%.

EXAMPLE 12

1.76 moles poly(1,4-butylene adipate); M.W. — 1010; OH No. — 111.1; Acid No. — 0.5; liquidus temperature — >55°≦55.9° C.
1 mole poly(1,4-butylene adipate); M.W. — 1965; OH No. — 57.1; Acid No. — 0.5; liquidus temperature — >59.8°≦60.8° C
7.36 moles 1,3-butanediol
10.11 moles Nacconate H-12, Allied Chemical Corp. TM for 4,4'-methylene-bis(cyclohexyl isocyanate) in stereoisomer ratio of 70% trans and 30% cis.
Reaction time: 17½ hours at an oven temperature of 130° C.; Inh. V. — 0.62; NCO — 0.03%.

EXAMPLE 13

1 mole poly(diethylene glycol adipate); M.W. — 1007; OH No. — 111.4; Acid No. — 1.8; liquid at room temperature.
2.53 moles 1,4-butanediol
3.53 moles toluene diisocyanate, 80.20 mixture of 2,4-2,6 isomers
0.01% dibutyltin dilaurate
Reaction time: 19 hours at an oven temperature of 130° C. (pot temperature 138°–142° C.); diisocyanate and catalyst dissolved therein added at 40° C.; no degassing; Inh. V. — 0.85; NCO — 0.1%.

EXAMPLE 14

1 mole poly(ethylene/propylene adipate); M.W. — 1886; OH No. — 59.5; Acid No. 13 0.6; liquidus temperature > 53.8°≦55.0° C.
3.49 moles 1,4-butanediol
4.49 moles Hylene W cycloaliphatic diisocyanate
0.01% dibutyltin dilaurate
0.6 pph Irganox 1093, Geigy Chemical Corp. TM for multifunctional hindred phenols
Reaction time: 21 hours at an oven temperature of 130° C.; catalyst dissolved in diisocyanate; Inh. V. — 0.87 (in DMF); NCO — 0.10%.

EXAMPLE 15

1 mole poly(1,6-hexylene adipate); M.W. — 1032; OH No. 13 108.7; Acid No. — 0.2; liquidus temperature >51.9°≦52.9° C.
2.61 moles 1,4-butanediol
3.61 moles 80% 2,4- and 20% 2,6-toluene diisocyanates
Reaction time: 19 hours at an oven temperature of 130° C.; no degassing; diisocyanate added at mixture temperature of 60° C.; Inh. V. of polymer — 0.25 (DMF); NCO — 0.03%

EXAMPLE 16

1 mole poly(1,4-butylene azelate); M.W. — 1925; OH No. 13 58.3; Acid No. — 0.5; liquidus temperature >43.7°≦44.3° C.
4.55 moles 1,4-butanediol
5.55 moles 80% 2,4- and 20% 2,6-isomers of toluene diisocyanate
Reaction time: 20½ hours at oven temperature of 126°–130° C.; no degassing; slightly yellow polymer due to yellow polyester; some bubbles in polymer; diisocyanate addition started at mixture temperature of 50° C., Inh. V. of polymer — 0.56, NCO — 0.13%.

EXAMPLE 17

1 mole poly (ε-caprolactone); M.W. — 1233; OH No. — 91; Acid No. — 0.02; liquidus temperature — >51.9°≦52.9° C.
3.05 moles 1,4-butanediol
4.05 moles toluene diisocyanate of commercial 80/20 isomer ratio of 2,4-2,6-isomers.
Reaction time: 17¾ hours at an oven temperature of 97° C.; no degassing or continuous nitrogen purge; diisocyanate addition started at mixture temperature of 36° C.; Inh. V. of calendered sheet — 1.73; NCO (of block) — 0.10%

EXAMPLE 18

1 mole poly(ε-caprolactone); M.W. — 850; OH No. — 132; Acid No. — nil; liquidus temperature > 44.3°≦44.9° C.
2.58 moles, 1,4-butanediol
3.58 moles toluene diisocyanate of 80% 2,4- and 20% 2,6-isomers
Reaction time: 26.5 hours at 92°-100° C.; no continuous oven nitrogen purge; diisocyanate addition started at mixture temperature of 38° C.; polymer clear but contained gas bubbles; Inh. V. — 0.61 at 30° C. at 0.5% concentration in dimethylformamide; NCO —<0.01%.

The compositions of Examples 19-27 were prepared by heating the reaction mixture in a 143° C. circulating air oven for 20 hours. Inherent viscosities were determined for a solution of 0.5 grams of polymer in 100 milliliters of chloroform solution at 30° C.

EXAMPLE 19

1 mole poly(1,4-butylene adipate); M.W. — 2011; OH No. — 55.8 ; Acid No. — 0.48; liquidus temperature >59.8°≦60.8° C.
1.784 moles poly(1,4-butylene adipate); M.W. — 1012; OH No. — 110.9; Acid No. — 0.51; liquidus temperature >55.0°≦55.9° C.
8.385 moles 1,4-butanediol
11.169 moles Hylene W cycloaliphatic diisocyanate
Inh. V. — 1.18; NCO — 0.07%

EXAMPLE 20

1 mole poly(1,4-butylene adipate); M.W. — 1989; OH No. — 56.4; Acid No. — 0.38; liquidus temperature >59.8°≦60.8° C.
1.767 moles poly(1,4-butylene adipate); M.W. — 1012; OH No. — 110.9; Acid No. — 0.51; liquidus temperature >55.0°≦55.9° C.
4.257 moles 1,4-butanediol
7.024 mole Hylene W cycloaliphatic diisocyanate
Inh. V of polymer — 0.81; NCO — 0.03%; Inh. V. of laminated sheet — 0.87

EXAMPLE 21

1 mole poly(1,4-butylene adipate); M.W. — 1989; OH No. — 56.4; Acid No. — 0.38; liquidus temperature >59.8°≦60.8° C.
1.767 moles poly(1,4-butylene adipate); M.W. — 1012; OH No. — 110.9; Acid No. — 0.51; liquidus temperature >55.0°≦55.9° C.
5.474 moles 1,4-butanediol
8.241 moles Hylene W cycloaliphatic diisocyanate
Inh. V. of polymer — 0.94; NCO — 0.11%; Inh. V. of laminated sheet — 1.25

EXAMPLE 22

1 mole poly(1,4-butylene adipate); M.W. — 1989; OH No. — 56.4; Acid No. — 0.38; liquidus temperature >59.8°≦60.8° C.
1.767 moles poly(1,4-butylene adipate); M.W. — 1012; OH No. — 110.9; Acid No. — 0.51; liquidus temperature >55.0°≦55.9° C.
6.291 moles 1,4-butanediol
9.058 moles Hylene W cycloaliphatic diisocyanate
Inh. V. of polymer — 1.02; NCO — 0.04%; Inh. V. of laminated sheet — 1.08

EXAMPLE 23

1 mole poly(1,4-butylene adipate); M.W. — 1989; OH No. — 56.4; Acid No. — 0.38; liquidus temperature >59.8°≦60.8° C.
2.737 moles 1,4-butanediol
3.737 moles Hylene W cycloaliphatic diisocyanate
Inh. V. of polymer — 1.05; NCO — 0.04%; Inh. V. of laminated sheet — 1.10.

EXAMPLE 24

1 mole poly(1,4-butylene adipate); M.W. — 2011; OH No. — 55.8; Acid No. — 0.48; liquidus temperature >59.8°≦60.8° C.
2.150 moles 1,4-butanediol
3.150 moles Hylene W cycloaliphatic diisocyanate
Inh. V. of polymer — 1.18 NCO — 0.02% Inh. V. of laminated sheet — 1.21

EXAMPLE 25

1 mole poly(1,4-butylene adipate); M.W. — 1012; OH No. — 110.9; Acid No. — 0.51; liquidus temperature — >55.0°≦55.9° C.
1.205 moles 1,4-butanediol
2.205 moles Hylene W cycloaliphatic diisocyanate
Inh. V. of polymer — 0.81; NCO — 0.10%; Inh. V. of laminated sheet — 0.98

EXAMPLE 26

1 mole poly(1,4-butylene adipate); M.W. — 1012; OH No. — 110.9; Acid No. — 0.51; liquidus temperature — 55.0°≦55.9° C.
0.904 mole 1,4-butanediol
1.904 moles Hylene W cycloaliphatic diisocyanate
Inh V. of polymer — 0.84; NCO — 0.84; NCO —0.09%; Inh. V. of laminated sheet — 1.03

EXAMPLE 27

1 mole poly(1,4-butylene adipate); M.W. — 1012; OH No. — 110.9; Acid No. —0.51; liquidus temperature — >55.0°≦55.9° C.
0.640 mole 1,4-butanediol
1.640 moles Hylene W cycloaliphatic diisocyanate
Inh. V. of polymer — 0.86; NCO — 0.07%; Inh. V. of calendered sheet — 0.90

In Examples 28-32, the general procedures of Example 1 were used except that no catalyst was used.

EXAMPLE 28

1 mole poly(1,4-butylene adipate); M.W. — 2010; OH No. — 55.8; Acid No. — 0.5; liquidus temperature — >59.8°≦60.8° C.
2.354 moles 1,4-butanediol
3.356 moles isopropylidene-4,4'-bis(cyclohexyl isocyanate) in a stereoisomer ratio of 77.5 percent trans and 22.5 percent cis (98.6% NCO assay). Polyester-butanediol reactants mixed at 147° C. Diisocyanate added over 10 minutes. Reactant mixture degassed for 4 minutes and cured for 20 hours in 149° C. oven. Ihn. V. of polymer — 0.78; NCO — 0.06%; Inh. V. of calendered sheet — 0.85.

EXAMPLE 29

1 mole poly(propylene adipate); M.W. — 1944; OH No. — 57.7; Acid No. — 0.45; liquid at room temperature
2.93 moles 1,4-butanediol
2.36 moles Hylene W cycloaliphatic diisocyanate
1.57 moles toluene diisocyanate of 80% 2,4- and 20% 2,5-isomers
Polyester-butanediol reactants mixed at 92° C. Diisocyanate added and reactant mixture cured for 20 hours in 143° C. oven; NCO of polymer — 0.05%; Inh. V. of calendered sheet — 1.87

EXAMPLE 30

1 mole poly(1,4-butylene adipate); M.W. — 4156; OH No. — 27; Acid No. —0.3; liquidus temperature — >60° C.
7.174 moles 1,4-butanediol
8.174 moles Hylene W cycloaliphatic diisocyanate
Reactants mixed at 130° C. and then heated for 20 hours in a 143° C. oven.
Inh. V. of polymer — 1.41; NCO — 0.10%; Inh. V. of calendered sheet — 1.13

EXAMPLE 31

1 mole poly(1,4-butylene azelate) M.W. — 2609; OH No. — 43; Acid No. — 0.31; liquidus temperature — >44° C.
5.15 mole 1.4-butanediol
6.15 moles Hylene W cycloaliphatic diisocyanate
Reactants mixed at 77°-82° C., then poured between two glass sheets having a 30 mil spacing and heated at 144° C. for total time of 24 hours; NCO — nil

EXAMPLE 32

1 mole poly(ethylene adipate); M.W. 1603; OH No. — 70; Acid No. — 0.12; liquidus temperature >58°≦62° C.
2.696 moles 1,4-butanediol
3.696 moles Hylene W cycloaliphatic diisocyanate
Reactants mixed at 71° C., then poured between two glass sheets having a 30 mil spacing and heated at 143° C. for 24 hours; NCO — mil The Gehman moduli taken two days after molding for some of the preferred compositions are given below and compared with plasticized polyvinyl butryal.

| Log of 3 Times the Shear Modulus in Dynes per Cm² | | | | | |
|---|---|---|---|---|---|
| Example No. | −20° C. | 0° C. | 23° C. | 50° C. | 100° C. |
| 19 | 9.45 | 8.92 | 8.09 | 7.84 | 7.53 |
| 20 | 8.02 | 7.84 | 7.81 | 7.40 | 6.90 |
| 22 | 9.00 | 8.53 | 8.26 | 7.87 | 7.49 |
| 25 | 8.02 | 7.87 | 7.53 | 7.46 | 6.58 |
| 8 | 8.27 | 8.13 | 8.02 | 7.85 | 7.60 |
| PVB | 10.25 | 9.70 | 8.25 | 7.20 | 7.63 |

It can be seen from the data that the preferred compositions have a relatively constant modulus in the leathery region at various temperatures, whereas the polyvinyl butyral composition is out of the leathery region at both −20° and 50° C. and is not relatively constant at the other two intermediate temperatures.

All the Example compositions meet the minimum light transmittance and haze requirements of the automobile code (ANSI Code Z-261 1966 Test No. 18).

Safety glass laminates were prepared employing as interlayers the compositions of Examples 1–29 and a commercial polyvinyl butyral polymer. The laminates, which measured 12 inches by 12 inches, employed glass sheets having a thickness of ⅛-inch and were formed by placing the interlayers (30 - 46 mils) between the two glass sheets and the laminates subjected to a temperature of 275°–350° F. and 200 p.s.i. for 45 minutes in an autoclave. Laminates were aged for one week at room temperature and then subjected to an impact resistance test. By this test, a five pound steel ball is dropped onto the laminate which is rigidly held by a horizontal steel frame, from various heights so that the ball strikes within one inch of the center of the laminate to determine the minimum height and thereby speed at which the ball will just pass through or rupture the laminate. Separate laminates were used for each drop test and several laminates were tested at each test temperature of 0° F., 70° F. and 120° F. A single mean penetration velocity at one temperature is given when all three ball drops effected approximately the same figure. Reference is made to the ANSI Code (2-26.1-1966) for a discussion of this test.

More recently, a new and different way of determining the impact resistance of safety glass laminates has been developed using a Residual Energy Analyzer. The Residual Energy Analyzer comprises an electronic timer and two sensors disposed directly below the position defined by a pair of accurately spaced steel frames and occupied by the laminate to be tested in the path taken by the five pound steel ball. Each sensor comprises an insulating ring to which are mounted six fine wires directed radially inward. The falling ball, which is made of steel, shorts two wires when it passes through the upper sensor, thus activating the timer. When the ball passes through the lower sensors, it deactivates the timer. The transit time ($t$) of the ball as it drops between the two sensors, the drop height ($h_1$) of the ball from its initial position to the plane of impact with the test laminate, the vertical distance from the laminate to the upper sensor ($h_2$) and the vertical distance between the sensors ($h_3$) constitute the raw data from which the penetration energy ( ⨆ ) is calculated from the formula:

$$\sqcup = mg\left(h_1 + h_2 + \frac{h_3}{2} - \frac{h_3^2}{2gt^2} - \frac{gt^2}{8}\right)$$

wherein $m$ is the mass of the ball and $g$ is the acceleration of gravity. The ball must be dropped at a height sufficient to insure its passage through the test laminate. Laminates identical in construction of those having a mean break height of 20 feet as determined by the older staircase technique produced readings of 21.62 feet when determined from a drop height of 25 feet and 20.71 feet when determined from a drop height of 30 feet. These results indicate good correlation between the older and newer methods of determining mean break height (or mean penetration velocity). Since the newer method requires fewer specimens to be broken for a statistically valid test, it has been used often recently. Test results are reported in miles per hour.

Table II

| Interlayer Example No. | Interlayer Thickness Inches | Autoclave Temperature (°F.) | Mean Penetration Velocity (MPH) 0°F. | 70°F. | 120°F. |
|---|---|---|---|---|---|
| 1 | .034–.037 | 275 | 34, >35 | 33, 35 | 25, <27 |
| 2 | .030–.036 | 350 | 17 | 37 | 31 |
| 3 | .032–.034 | 275 | >32, >37 | 34 | 18, 24, 29 |
| 4 | .037–.042 | 275 | >21, >32, 36 | 30, 32, 33 | 18, 21, 24 |
| 5 | .027–.032 | 275 | >30, 37 | 30, 31, 32, >37 | 20, 24, <27, <32 |
| 6 | .032–.037 | 275 | >32, 34, >37 | 32, 33, 36 | 21, 23, <30 |
| 7 | .032–.035 | 350 | >32, 35 | 32 | 23, 30 |
| 8 | .033–.036 | 350 | >37 | 32 | 25 |
| 9 | .027–.033 | 275 | >21, >27, >37 | 26, 32, 32, 33 | 25, 26, 27, 30 |
| 10 | .032–.036 | 275 | 21, 23, 24 | >35, 36 | 28, 32 |
| *11 | .030 | 275 | 20 | 35 | 29 |
| 12 | .032–.034 | 350 | Brittle | 24, 35 | 13, 28 |
| 13 | .032–.046 | 275 | Brittle | >37 | 24 |
| *14 | .030 | 275 | — | 34 | 24 |
| *15 | .030 | 275 | Brittle | 35 | 26 |
| 16 | .032–.035 | 275 | 24 | 30 | 19 |
| 17 | .030–.032 | 300 | Brittle | 30 | 20 |
| 18 | .030–.032 | 300 | Brittle | 28 | 21 |
| 19 | .030 | 275 | 22 | 35 | 26 |
| 20 | .031–.035 | 275 | 33 | 27 | 19 |
| 21 | .029 | 275 | 36 | 34 | 23 |
| 22 | .030–.037 | 275 | 31 | 36 | 28 |
| 23 | .032–.034 | 275 | 36 | 30 | 23 |
| 24 | .033–.034 | 275 | >37 | 29 | 22 |
| 25 | .034–.036 | 275 | Brittle | 36 | 25 |
| 26 | .031–.034 | 275 | 29 | 30 | 21 |
| 27 | .030 | 275 | >35 | 30 | 18 |
| 28 | .030 | 275 | 31 | 28 | 19 |
| 29 | .028–.035 | 275 | >27 (35 mils) | 32 (33 mils) | 18 (30 mils) |
| 29 | .030 | 275 | 21.5 | 28.1 | 20 |
| PVB | .028–.035 | 275 | 16 | 24 | 13 |
| 30 | .032 | 275 | 28 | 32 | 22 |
| 31 | .030 | 275 | <23 | 24.5 | 22 |
| 32 | .030 | 275 | 15.5 | 23.5 | 20.5 |

*Adhesion promoter prepared from 1.00 mole poly (tetramethylene) glycol (MW 1005), 2.07 moles 1,4-butanediol and 3.06 moles Hylene W heated for 21 hours in 130° C. non-circulating air oven (NCO 0.03, Inh. V. O.53) dissolved in benzyl alcohol (5% by weight)

From the data of Table II, it can be seen that the compositions of the invention can be used effectively as interlayer materials in safety glass laminates. They are effective over a broad temperature range and are generally superior to commercial polyvinyl butyral. Further, it can be seen by varying the concentration of the reactants that a composition can be prepared for a particular use and temperature. The compositions are particularly suitable for use in vehicle windshields because of their room temperature properties. This is important because an automobile windshield is normally maintained at or near room temperature by the application of internal heat in the wintertime and at ambient temperature in the summertime.

The safety glass industry has developed several test facilities to evaluate the safety of laminated windshields. One type of test facility is a sled of the type illustrated at page 143 of the "Eleventh STAPP Car Crash Conference" proceedings published by the Society of Automotive Engineers, Inc., New York, N.Y. in 1967.

The typical facility for testing laminated windshields described in this publication comprises a full scale automotive windshield test machine that pneumatically fires a sled (gross load approximately 500 pounds including the 50th percentile Alderson or Sierra dummy) to a preselected speed. The sled and its actuating cylinder are stopped hydraulically. The sled is provided with a bucket-type seat supporting the dummy and is accelerated to a desired impact speed with pneumatic cylinder which disengages from the sled before the latter engages a decelerating cylinder. Electronic measurement apparatus measures the sled velocity in the interval between its disengagement from the accelerating cylinder and its engagement with the decelerating cylinder. The sled is brought to stop at the desired point of the decelerating cylinder.

When the sled stops, the dummy continues on in a manner duplicating a barrier-type impact in which the vehicle is stopped before the passenger impacts vehicle components. Another way of interpreting the results is to consider the relative velocity at impact and equate it to other types of accidents in which such relative velocities are achieved.

A windshield frame is mounted at an angle of 70° above the track along which the sled travels. The windshield mount is used to assure the same mounting conditions or resiliency, frame support, angle of glass, and the surrounding components. This insures the reasonable reality of test conditions. The apparatus is so arranged that the forehead of the dummy engages the test windshield 5 to 6 inches below its upper mounting in the plane of glass. The windshields are mounted in a frame using adhesive glazing similar to most domestic, commercial production mountings. This also faciliates replacement of test windshields.

Biaxial accelerometers are mounted immediately behind the forehead area of the head of the dummy to measure the deceleration at impact. The decelerations are then compared with the deceleration injury curve to determine whether concussive injury is likely to occur. These comparisons in terms of Severity Index will be described later.

A means of determining soft-tissue injury, and particularly minor soft-tissue injury, has been achieved by covering the head of the dummy with two layers of a chamois or goat skin to simulate human skin. Shallow scratches to the outer layer only are classed as minor and given an injury rating of 1, whereas deep lacerations through both layers of the simulated skin are considered as serious and given an injury rating of 5, with intermediate degrees of damage rated 2, 3 or 4, depending upon the severity of the damage, such as, for example, 2 for a few shallow cuts to the top layer only, 3 cuts and gouges of the top layer, and 4 for many cuts and gouges, a few of which are in both layers.

A factor known as the Severity Index has become identified with relative safety of windshields as determined by impact tests using the 50th percentile dummy whose face is covered with two layers of moist chamois on the test sled apparatus. The Severity Index (S.I.) is calculated by the Gadd equation:

$$S.I. = \int_o^t A^{2.5} dt,$$

wherein A is deceleration in units of gravity and $dt$ is the time differential in milliseconds between the moment of impact of the head of the dummy with the test windshield to the time a horizontal accelerometer attached to the dummy head indicates a sudden negative load. This value is determined for each millisecond during the time interval and the values integrated for the whole time period. In other words, the Severity Index is calculated from the area under a curve resulting from a plot of acceleration forces acting on the dummy head as a function of time. A Severity Index of 1,000 has been suggested as the injury threshold for head impacts. In general, the Severity Index increases with velocity of impact.

The 22-pound falling headform test can also be used to calculate a Headform Severity Value (HSV). In this test, the headform is dropped from a predetermined height onto a rigidly held laminate in much the same manner as the 5 pound ball impact test. The measurement of the deceleration forces on the headform upon impact is determined by a linear accelerator mounted in the headform. The vertical deceleration forces in $g$ s (32 feet per second$^2$) are measured as a function of time. The measurements are plotted graphically with deceleration forces being plotted as the ordinate and the time in milliseconds being plotted as the abscissa. The Headform Severity Value is calculated from such a plot using the above Gadd Equation.

For a more thorough description of Severity Index, see "Human Tolerance to Impact Conditions as Related to Motor Vehicle Design" by the Society of Automotive Engineers Handbook Supplement J885, 1964; and "Use of a Weighted-Impulse Criteria of Estimating Injury Hazard" by J. P. Danforth and C. W. Gadd from the conference proceedings 10*th Stapp Car Crash Conference* reprinted by the Society for Automotive Engineers, December 1966. Also, see "Laboratory Studies on Laminated Safety Glass and Installations on Performance" by R. G. Reiser and J. Chabal, presented at the 13*th Stapp Car Crash Conference, reprinted by the Society for Automotive Engineers, December* 1969.

The test results for windshields fabricated using a composition prepared by the procedure of Example 23 and a commercial polyvinyl butyral (PVB) composition as the interlayers are shown in Table III. The interlayers were approximately 30 mils thick and the float glass about ⅛ inch thick. The windshields were heated in an autoclave for 45 minutes at 275° F. and 200 p.s.i.g. As the data of Table III show, the preferred polyesterurethanes provide windshields with severity indices less than 1,000 when the windshield is not penetrated by the dummy and the windshield is impacted at a velocity of about 25 miles per hour by a dummy of average weight while the windshield is maintained at a temperature of 30°, 75° or 110° F. Further, the total length of polyesterurethane tear is less than about 5 inches and the laceration rating is not more than 3. The data also show that at 75° F. the windshield prepared with the polyesterurethane withstood a dummy impact of about 31 mph. without the dummy penetrating.

TABLE III (Sled Impact Test Results)

| Interlayer | Windshield Temp. (° F.) | Velocity of Dummy, at Impact (m.p.h.) | P = Penetration of Windshield H = Held | Total length of Interlayer Tear (Inches) | Laceration Rating | Severity Index |
|---|---|---|---|---|---|---|
| Composition of Example 23 | 30 | 25.6 | H | 0 | 1 | 807 |
|  | 75 | 25.6 | H | 0 | 2 | 485 |
|  | 75 | 30.8 | H | 0 | 2 | 918 |
|  | 110 | 24 | H | 1 | 3 | 476 |
| PVB | 30 | 25 | H | 20 | 2 | 800 |
|  | 75 | 25 | H | 10 | 3–4 | 700 |
|  | 110 | 25 | P | 25 | 5 | — |

PVB is commercial poly(vinyl butyral) interlayer

From the data reported in Table III, it can be seen that the composition of the invention is effective over a wide temperature range and is superior to the PVB interlayer at high impact velocities as evidenced by the low laceration ratings, limited amount of interlayer tear and low severity indices. In addition to the reported data, the compositions of the invention stretched to a considerable extent so as to prevent or minimize concussion injury, and also adhered well to the glass inhibiting scattering of broken particles.

The following Examples are illustrative of bilayer laminates wherein the composition of the invention is adhered to a single layer of glass.

EXAMPLES 33-35

Three polyesterurethanes prepared by the procedure and proportions of Example 1 are sandwiched between two glass sheets (annealed float glass or thermally tempered plate glass as indicated) one of which glass sheets was covered on the interface with a release material of 1-mil thick Tedler film and the other was treated on the interface with an adhesion promoter of 1 percent solution by weight N-(beta amino ethyl) gamma amino propyltrimethoxysilane in isopropyl alcohol and water. The solvent solution was prepared from 250 milliliters of isopropanol and 195 milliliters water from which a 99 gram portion was taken and mixed with 1 gram of the silane. The adhesion promoter was then sprayed on the glass sheet and allowed to dry. The sandwich was then subjected to a temperature between 275° F. and 350° F. at 200 pounds per square inch pressure for 45 minutes in an autoclave. After lamination, the glass sheet treated with the release composition was removed. The resulting bilayer laminates were then subjected to impact testing using the sled test described hereinbefore. Impacts were made on the polyesterurethane side and the results are shown in the following Table IV.

TABLE IV

Severity Index - Penetration Resistance - Lacerative Injury

Using Sled Test Technique, 24" × 36" Panels,
Temperature During Testing 75° F.,
Impact Angle 35° Off Horizontal

| Example No. | Laminate Configuration | Speed at Impact (miles per hour) | Severity Index | Inner Layer Tear in Inches | Lacerative Injury |
|---|---|---|---|---|---|
| 33 | 0.030" polyurethane-⅛" thermally tempered plate glass | 26.2 | 336 | 0 | 1 |
| 34 | 0.030" polyurethane-⅛" thermally tempered plate glass | 26.8 | 356 | 0 | 1 |
| 35 | 0.030" polyurethane-⅛" annealed float glass | 26.2 | 576 | 3 | 1 |

The following Examples are illustrative of urethanes containing urea linkages which can be employed in the invention. They can be prepared by the general procedure of Example 1 and, thus, only the reactants and reaction conditions are given.

EXAMPLE 36

| | Moles |
|---|---|
| 1965 MW poly(1,4-butylene adipate); liquidus temperature - >59.8 ≤60.8° C. | 1.00 |
| 1010 MW poly(1,4-butylene adipate); liquidus temperature - >55.0 ≤55.9° C. | 1.76 |
| 1,4-butanediol | 3.615 |
| Methylene dianiline (MDA) | 3.615 |
| Hylene W cycloaliphatic diisocynate | 9.99 |
| 0.005 percent of dibutyltin dilaurate by weight of reactants | |

Reaction Time: 2 hours at 143° C.

EXAMPLE 37

| | Moles |
|---|---|
| 1965 MW poly(1,4-butylene adipate); liquidus temperature - >59.8 ≤60.8° C. | 1.00 |
| 1010 MW poly(1,4-butylene adipate) liquidus temperature - >55.0 ≤55.9° C. | 1.76 |
| Hylene W cycloaliphatic diisocyanate | 9.99 |
| 0.005 percent of dibutyltin dilaurate by weight of reactants | |
| A prepolymer of the above reactants is made in 2 hours at a reaction temperature of 65-70° C. and then the following mixture added: | |
| 1,4-butanediol | 3.615 |
| Methylene dianiline | 3.615 |

Reaction Time: 2 hours at 143° C.

EXAMPLE 38

| | Moles |
|---|---|
| 1965 MW poly(1,4-butylene adipate); liquidus temperature - >59.8 ≤60.8° C. | 1.00 |
| 1010 MW poly(1,4-butylene adipate); liquidus temperature - >55.0 ≤55.9°C. | 1.76 |
| Hylene W cycloaliphatic diisocyanate | 6.39 |
| 0.005 percent of dibutyltin dilaurate by weight of reactants | |
| A prepolymer of the above reactants is made in 2 hours at a reaction temperature of 65-70° C. and then the following amine added: | |
| Methylene dianiline | 3.62 |

Reaction Time: 2 hours at 143° C.

EXAMPLE 39

| | Moles |
|---|---|
| 2000 MW poly(1,4-butylene adipate); liquidus temperature - >59.8 ≤60.8° C. | 1.00 |
| Hylene W cycloaliphatic diisocyanate | 4.67 |
| 0.005 percent of dibutyltin dilaurate by weight of reactants | |
| A prepolymer of the above reactants is made in 2 hours at a reaction temperature of 65-70° C. and then the following amine added: | |
| Methylene dianiline | 3.67 |

Reaction Time: 2 hours at 143° C.

EXAMPLE 41

A polyesterurethane was prepared from the reactants: a. poly(1,4-butylene adipate)diol having a number average molecular weight of about 1995; liquidus temperature — >59.8° ≤60.8° C.; b. 1,4-butanediol, and (c) Hylene W cycloaliphatic diisocyanate in a mole ratio of about 1.00/2.74/3.74, respectively, in the following manner. The poly(1,4-butylene adipate)diol polyester and 1,4-butanediol were blended together at a temperature of about 170° F. Hylene W cycloaliphatic diisocyanate, at a temperature of about 113° F., was mixed with the aforementioned reactant blend and the total reaction mixture, which had a temperature of about 157° F., was introduced into pans and cured in a 212° F. oven for about 20 hours. To catalyze the urethane reaction, 40 parts per million of stannous octoate were added to the reaction mixture. The atmosphere in the oven was found to have less than about 2 percent oxygen. Each pan was filled with sufficient quantity of the reaction mixture to produce about a 50 pound block of polyesterurethane. The polyesterurethane blocks were granulated and the granules blended to obtain a homogeneous mixture. The granular blend was then extruded into sheeting of 15, 20 and 25 mil thicknesses. The polyesterurethane sheet tested was found to have an average inherent viscosity of about 1.14 dl/g. and an average residual isocyanate level of about 0.050%. Samples of the aforesaid sheeting were laminated (a) between two sheets of 12 × 12 × ⅛ inch glass, (b) between two sheets of 24 × 36 × 3/32 inch glass, and (c) between two sheets of 3/32 inch full size shaped automotive windshield glass. The glass laminates were laminated by heating the laminates in an oil autoclave at 300° F. and 200 p.s.i. The 12 × 12 × 1/8 inch laminates were tested for impact resistance by dropping a 5-pound steel ball onto them and calculating the mean penetration velocity at which the ball just penetrates. The windshields were tested by propelling a dummy mounted on a sled against the conventionally mounted windshield at a preselected velocity. The 24 × 36 × 3/32 inch laminates were tested by dropping a 22-pound headform onto the laminate and approximating the mean penetration velocity. Results are listed in Tables V - VII.

EXAMPLE 42

Polyesterurethane was prepared and tested in a manner similar to Example 41. The poly(1,4-butylene adipate) diol had a number average molecular weight of about 2023 (liquidus temperature — >59.8° ≤60.8° C.) and the reactants were employed in a mole ratio of about 1.00/3.15/4.15 for the poly(1,4-butylene adipate)-diol/1,4-butanediol/Hylene W diisocyanate, respectively. The polyester-1,4-butanediol blend temperature was about 187° F. and the total reactant mixture after mixing with the diisocyanate was about 169° F. The reaction mixture was cured in a 216° F. oven temperature having an ambient air atmosphere for 20 hours. The average inherent viscosity of the polyesterurethane sheet was about 1.13 dl/g. and the average residual isocyanate in the product was about 0.033%. This polyesterurethane product was extruded into 15, 20 and 30 mil thick sheeting.

EXAMPLE 43

Polyesterurethane was prepared in a manner similar to Example 41. The poly(1,4-butylene adipate)diol had a number average molecular weight of about 2023 (liquidus temperature — >59.8° ≦ 60.8° C.) and the reactants were used in a mole ratio of about 1.00/3.69/4.69 for the poly(butylene adipate)diol/1,4-butanediol/Hylene W diisocyanate, respectively. The reactants were mixed at the same temperature described in Example 42 and the resulting total reactant mixture had a temperature of about 165° F. The reaction mixture was cured in a 215° F. oven temperature having an ambient air atmosphere for 20 hours. The average inherent viscosity of the polyesterurethane sheet was about 1.11 dl/g. and the average residual isocyanate level in the polyesterurethane product was about 0.036%. This polyesterurethane product was extruded into 18 and 20 mil thick sheeting.

EXAMPLE 44

Polyesterurethane was prepared in a manner similar to Example 43. The poly(1,4-butylene adipate)diol had a number average molecular weight of about 2010 (liquidus temperature — >59.8° ≦ 60.8° C.). The mole ratio of reactants was 1.00/3.69/4.71. The reactant mixture attained a temperature of 101° C. (on mixing). After 10 minutes, the mixture had a temperature of 98° C. The mixture was cured in a 143° C. oven for 20½ hours. The inherent viscosity of the product was 1.32 dl/g. The extruded sheet had an inherent viscosity of 1.24 dl/g and a residual NCO of 0.038%.

The results of the impact resistance testing for the glass laminates prepared using the sheeting of Examples 41–44 as compared to glass laminates prepared with 30 mil thick polyvinyl butyral as the interlayer material are presented in Tables V – VII.

TABLE V

Impact Resistance - 5 Pound Steel Ball Tests 12 × 12 × ⅛" Glass Laminates

| Interlayer Composition Example No. | Interlayer Thickness, mils | Mean Penetration Velocity, mph | | |
|---|---|---|---|---|
| | | 0° F | 70° F. | 120° F. |
| 41 | 15 | 21 | 18 | 14 |
| 41 | 20 | 29 | 21 | 15 |
| 41 | 25 | 32 | 26 | 17 |
| 42 | 15 | 21 | 20 | 15 |
| 42 | 20 | 27 | 23 | 17 |
| 42 | 30 | 35 | 27 | 22 |
| 44 | 30 | >37 | 32 | 27.4 |
| HPR*[1] | 28–35 | 16 | 24 | 13 |

*HPR - Polyvinyl butyral
[1]From Table II

TABLE VI

Impact Resistance - Windshield Sled Tests

| Interlayer Composition Example No. | Interlayer Thickness, mils | Temperature ° F. | Sled Velocity mph | Average Tear Inches | Average Severity Index |
|---|---|---|---|---|---|
| 41 | 20 | 0 | 25 | 4.9 | 441 |
| 42 | 20 | 0 | 25 | 5.3 | 372 |
| HPR | 30 | 0 | 25 | 42.0 | 436 |
| 41 | 20 | 75 | 25 | 1.3 | 357 |
| 42 | 20 | 75 | 25 | 1.7 | 402 |
| 42 | 30 | 75 | 25 | 0.7 | 480 |
| HPR | 30 | 75 | 25 | 7.4 | 345 |
| 41 | 20 | 110 | 20 | 5.0 | 168 |
| 42 | 20 | 110 | 20 | 2.1 | 148 |
| HPR | 30 | 110 | 20 | 27.1 | 150 |

TABLE VII

Impact Resistance - 22 Pound Headform 24" × 36" × 3/32" Glass Laminates

| Interlayer Composition Example No. | Interlayer Thickness, mils | Estimated Mean Penetration Velocity, mph | | |
|---|---|---|---|---|
| | | 0° F. | 70° F. | 120° F. |
| 43 | 18 | Brittle | 21 | 14.5 |
| 43 | 20 | Brittle | 25 | 17 |
| 41 | 20 | 27 | 20 | 15.5 |
| 42 | 20 | 25.5 | 20.5 | 16 |
| PVB | 30 | Brittle | 21 | 9.4 |

The data of Tables V, VI, and VII show that 15 and 20 mil thick sheeting prepared from the compositions of Examples 41 and 42 have improved impact performance at 0° and 120° F. as compared to thicker (30 mil) polyvinyl butyral sheeting which is the commercial product presently used in automotive safety glass applications. The aforementioned data show further that the thinner sheeting of the compositions of Examples 41 and 42 provide substantially equivalent impact performance as 30 mil polyvinyl butyral sheeting at 70° F. The data of Table VII show still further that 20 mil thick sheeting prepared from the composition of Example 43 provides substantially equivalent performance at 0° and 70° F. and improved performance at 120° F. when compared against conventional 30 mil polyvinyl butyral sheeting. The data of Table V show that a polyesterurethane (Example 44) of the same composition as Example 43; but, of higher molecular weight is not brittle at 0° F.

TECHNICAL SECTION

Laminate —
Destructive Testing

Ball drop results are commonly reported in the literature as the height from which the ball was dropped. In order to permit one to compare other results with the mean penetration velocities reported herein, the following Table is provided. The Table indicates the approximate distance from which the ball must be dropped to equal the miles per hour readings recorded herein:

| FEET | MPH |
|---|---|
| 5 | 12 |
| 10 | 17 |
| 20 | 24 |
| 21 | 25 |
| 22 | 26 |
| 24 | 27 |
| 26 | 28 |
| 28 | 29 |
| 30 | 30 |
| 32 | 31 |
| 34 | 32 |
| 36 | 33 |
| 38 | 34 |
| 40 | 35 |
| 43 | 36 |
| 45 | 37 |
| 48 | 38 |
| 50 | 39 |

NCO Content of Urethane

Polyesterurethane suitable for use in the invention are substantially completely reacted (i.e., the polyesterurethane formation is substantially complete) within the meaning of the specification and claims, when the urethane-forming reactants are heated at a temperature of 143° C. for 20 hours without a catalyst.

A procedure that can be employed to determine the isocyanate (NCO)content of the polyesterurethanes is as follows: a 0.5 gram sample of polyesterurethane is placed between two pieces of Tedlar polyethylene film cut in squares about 4 centimeters on a side and the composite placed in an oven for about 5 minutes at a temperature between about 160° and 170° C. until the sample softens. The hot composite is then placed between the hot plates of a Pasadena Hydraulic Inc. Press, Model B-244, and 10 tons of pressure applied to the laminate. The polyesterurethane sample is then removed from the press and mounted in the beam of a Perkin-Elmer, Model 621, Spectrophtometer, and the beam traced from 2350 centimeters$^{-1}$ to 2000 centimeters$^{-1}$. A baseline is then drawn across the shoulders of the 2250 centimeters$^{-1}$ NCO band and the absorbance of the baseline at 2250 centimeters$^{-1}$ subtracted from the peak absorbance of the 2250 centimeters$^{-1}$ NCO band to determine the net absorbance of the NCO band. The percent NCO is then determined from the formula:

$$C = \frac{A}{a^D} \times \frac{\text{Molecular Weight of NCO groups}}{\text{Molecular Weight of Diisocyanate}}$$

0.32 for Hylene W cycloaliphatic diisocyanate
  wherein C = % NCO
$a$ = absorbance per 1 percent diisocyanate per millimeter thickness; or 8.1 for Hylene W diisocyanate
$A$ = net absorbance of the NCO band and
$D$ = the film thickness.

Although the best results are found when the polyurethane is prepared by reacting the polyester with a dissocynate and a low molecular weight compound containing active hydrogens, such as an aliphatic diol, it is possible to prepare polyurethane compositions without employing the low molecular weight active hydrogen compound by employing a polyester of lower average molecular weight. Thus, for example, a polymer chemist of ordinary skill in the art can prepare a polyester which has the same number average molecular weight as the combination of a high molecular weight polyester and a low molecular weight active hydrogen compound and such polyester reacted with a diisocyanate.

Polyurethanes encompassed herein can also be made by other methods. For example, phosgene can be reacted with the hydroxyl-terminated polyesters and low molecular weight diols to form bis-(chloroformates) and these reacted with a diamine such as the diisocyanate precursor. Alternatively, carbamoyl chlorides can be reacted with hydroxy-terminated polyesters and low molecular weight diols. These methods are more fully explained in Bissinger et al, U.S. Pat. No. 3,215,668 herein incorporated by reference in its entirety.

Especially important laminate configurations of the invention are the bilayer and trilayer laminates. The trilayer in which the polyesterurethane is cast between two sheets of glass or formed into a sheet and sandwiched between two glass sheets, and heated at elevated temperature and pressure to adhere the polyesterurethane to the glass sheets is particularly suitable for automobile windshields. This is because the polyesterurethane interlayer is not normally ruptured in an automobile collision but stretches so that concussive injury to the occupants is minimized. Further, the polyesterurethane prevents the scattering of glass and causes the glass to break in relatively small particles which reduces lacerative injury to occupants of the vehicle. In the preferred trilayer configuration, the polyesterurethane interlayer is the only interlayer material. Of course, in addition to the interlayer material there may be present between the glass sheets adhesion control agents such as adhesion promoters or inhibitors or other chemicals which might include cleaning agents, release agents, and the like. That is, a preferred trilayer laminate is made up of but two sheets of glass spaced from one another by an interlayer made up only of the polyesterurethane but for the presence of minor amounts of agents such as adhesion control agents, plasticizers, and other chemicals which are present other than for interlayer purposes.

Bilayer configuration with polyesterurethane as a inner layer are also ideally suited for use as an automobile windshield because in addition to the advantages of a trilayer, passengers are less likely to incur concussive injury, and lacerative injury when propelled into a bilayer windshield. In the bilayer configuration, the polyesterurethane is adhered to a single sheet of glass and the polyesterurethane constitutes the inner surface of the windshield so that occupants impact against the polyesterurethane sheet rather than a sheet of glass when the windshield is impacted. Further, the inner surface of the polyesterurethane is self-healing, which means that it can be scratched and the smooth surface will be restored in just a few minutes. This enhances their use in a bilayer or multi-ply laminate when the polyesterurethane is the innermost ply. The exposed surface of the polyesterurethane layer may be provided with a thin coating to preserve its optical qualities or coated with an anti-static agent to reduce dirt accumulation. It is also possible to coat protectively the inner surface with a thin layer of a scratch resistant transparent material, e.g., a thin layer of a melamine resin or silica based film. Generally these coatings or films wil be quite thin, i.e., only a few microns in thickness. The term "bilayer" as employed herein and in the claims refers to a configuration having as its essential components only one sheet of glass with an inner layer made up substantially only of the polyesterurethane, recognizing that besides these principal components the bilayer may include adhesion promoting agents, and the like (as discussed with respect to trilayer configuration) as well as the thin protective surface or films above discussed.

In addition to these bilayer and trilayer configurations, the use of polyesterurethane as at least one interlayer component in a configuration of four or more plies is contemplated. Such configurations are those in which the plies are of glass, polycarbonate, polyvinyl butyral and other materials besides the polyesterurethane ply. For example, bullet-proof glass can be made of many plies but when the inner ply is made of polyesterurethane the injury to humans will be minimized in a collision. Bullet-proof glass has been made with from three to twenty-five plies in which an interlayer such as polyvinyl butyral or polycarbonate is sandwiched between glass plies. The thickness of the glass plies has been from one-quarter to three-eights to even one-inch thick; polycarbonate inter plies of one-eighth, three-sixteenths and one-quarter inch have been used; and the plastic materials such as polyvinyl butyral and polyesterurethane are generally from 0.020 to 0.040 inch. The polyesterurethane of the invention can likewise be employed in these multi-ply laminates with or without other plastic materials such as polyvinyl butyral and polycarbonate.

When used in the appended claims, the use of the term "transparent" in connection with polyesterurethane refers to a polyesterurethane having a minimum light transmission of 70 percent and less than 2 percent haze on an abraded specimen as determined by A.N.S.I. Code Z 26.1, 1966, Test No. 18.

Mean penetration velocity as used in the appended claims is the average velocity at which a 5 pound free-falling steel 3¼ inch diameter ball will just pass through a laminate made up of a polyesterurethane interlayer sandwiched between two sheets of one-eighth inch thick 12-inch by 12-inch float glass to form a laminate with the laminate held rigid, the polyesterurethane sheet approximately 0.030 inch thick and the laminate maintained at a temperature of 0° F., 70° F., or 120° F.

The term "sheet", as used in the appended claims, with reference to the polyesterurethane encompasses not only self-supporting pre-formed polyurethane but also cast-in-place or a polyesterurethane layer achieved by any means.

Although the present invention has been described with reference to the specific details of particular embodiments thereof, it is not intended that such details be regarded as limitations upon the scope of the invention, except insofar as and to the extent that they are included in the accompanying claims.

We claim:

1. An optically-clear, energy-absorbing laminate, comprising at least one glass sheet bonded to a sheet of a substantially unreacted isocyanate free, thermoplastic, transparent polyesterurethane that is the reaction product of (a) essentially linear hydroxy-terminated polyester having a liquidus temperature of at least 44° C., said polyester being selected from the group consisting of poly(1,4-butylene adipate) and poly(1,4-butylene azelate) having a molecular weight of about 2000, (b) 4,4'-methylene-bis-(cyclohexyl isocyanate), and (c) aliphatic diol containing from 4 to 8 carbon atoms, the mole ratio of (c) to (a) being from about 1.5:1 to about 5:1, the isocyanate groups provided by (b) being substantially numerically equivalent to the sum of hydroxyl groups provided by (c) and (a) whereby to provide a polyesterurethane that is substantially free of unreacted isocyanate groups, said mole ratio of (c) to (a) being so proportioned within said range that a rigidly held laminate prepared from about 0.030 inch thick sheeting of said polyesterurethane sandwiched between two 12 × 12 × ⅛ inch glass sheets is non-brittle at 0° F. and exhibits a mean penetration velocity of at least 20 miles per hour at laminate temperatures of 0° F. and 70° F., and a mean penetration velocity of at least 17 miles per hour at a laminate temperature of 120° F. when impacted with a five pound free falling steel ball.

2. The laminate of claim 1 wherein the polyesterurethane sheet is an interlayer between two sheets of glass.

3. The laminate of claim 1 wherein the polyesterurethane is a random block polymer.

4. The laminate of claim 1 wherein the stereoisomer content of the 4,4'-methylene-bis-(cyclohexyl isocyanate) is about 55 percent total trans and about 45 percent total cis.

5. The laminate of claim 1 wherein the stereoisomer content of the 4,4'-methylene-bis-(cyclohexyl isocyanate) is about 19 to 21 percent trans, trans, 17 to 18 percent cis, cis, and 62 to 64 percent cis, trans.

6. The laminate of claim 1 wherein the aliphatic diol is 1,4-butanediol.

7. The laminate of claim wherein the polyesterurethane is prepared by simultaneously reacting reactants (a), (b) and (c) at temperatures of between about 65° C. and 180° c.

8. The laminate of claim 1 wherein the polyesterurethane has a urethane content of from 10 to 20 percent.

9. The laminate of claim 1 wherein the hard segment of the polyesterurethane comprises from 15 to 45 percent.

10. The laminate of claim 1 wherein the polyesterurethane has an inherent viscosity of from 0.8 to 1.6 dl/g, as measured at a 0.5 percent concentration in N-methyl-2-pyrrolidone at 30° C.

11. The laminate of claim 1 wherein the polyester is poly(1,4-butylene adipate) having a molecular weight of about 2000, the stereoisomer content of the 4,4'-methylene-bis-(cyclohexyl isocyanate) is about 19 to 21 percent trans, trans, 17 to 18 percent cis, cis, and 62 to 64 percent cis, trans, and the aliphatic diol is 1,4-butanediol.

12. The laminate of claim 1 wherein the polyesterurethane sheet is an interlayer between two sheets of glass.

13. The laminate of claim 12 wherein the polyesterurethane sheet has a thickness of from 15 to 45 mils.

14. The laminate of claim 11 wherein the polyesterurethane has an inherent viscosity of from 0.8 to 1.6 dl/g, as measured at a 0.5 percent concentration in N-methyl-2-pyrrolidone at 30° C.

15. The laminate of claim 14 wherein the polyesterurethane has a urethane content of from 12 to 17.5 percent.

16. The laminate of claim 15 wherein the hard segment of the polyesterurethane is from 20 to 36 percent.

17. The laminate of claim 13 wherein the thickness of the sheet is from 18 to 22 mils.

18. The laminate of claim 1 wherein the polyester is poly(1,4-butylene azelate) having a molecular weight of about 2000, the stereoisomer content of the 4,4'-methylene-bis-(cyclohexyl isocyanate) is about 19 to 21 percent trans, trans, 17 to 18 percent cis, cis, and 62 to 64 percent cis, trans, and the aliphatic diol is 1,4-butanediol.

19. An optically-clear, energy-absorbing laminate, comprising at least one glass sheet bonded to a sheet of a substantially unreacted isocyanate free, thermoplastic, transparent polyesterurethane that is the reaction product of (a) essentially linear poly(epsilon caprolactone) diol having a molecular weight of between about 1000 and about 2000 and a liquidus temperature of at least 44° C., (b) 4,4'-methylene-bis(cyclohexyl isocyanate), and (c) aliphatic diol containing from 4 to 8 carbon atoms, the mole ratio of (c) to (a) being from about 0.4:1 to about 5:1, the isocyanate groups provided by (b) being substantially numerically equivalent to the hydroxyl groups provided by (a) and (c) whereby to provide a polyesterurethane that is substantially free of unreacted isocyanate groups, said mole ratio of (c) to (a) being so proportioned within said range that a rigidly held laminate prepared from about 0.030 inch sheeting of said polyesterurethane sandwiched between two 12 × 12 × ⅛ inch sheets of glass is non-brittle at 0° F. and exhibits a mean penetration velocity of at least 20 miles per hour at laminate temperatures of 0° F. and 70° F., and a mean penetration velocity of at least 17 miles per hour at a laminate temperature of 120° F. when impacted with a five pound free falling steel ball.

20. The laminate of claim 19 wherein the aliphatic diol is 1,4-butanediol.

21. The laminate of claim 20 wherein the 4,4'-methylene-bis(cyclohexyl isocyanate) has a stereoisomer content of about 55 percent total trans and about 45 percent total cis.

22. The laminate of claim 20 wherein the 4,4'-methylene-bis(cyclohexyl isocyanate) has a stereoisomer content of about 19 to 21 percent trans, trans, 17 to 18 percent cis, cis and 62 to 64 percent cis, trans.

23. The laminate of claim 22 wherein the polyesterurethane sheet has a thickness of from 15 to 45 mils.

24. The laminate of claim 22 wherein the polyesterurethane has a urethane content of from 12 to 17.5 percent.

25. The laminate of claim 24 wherein the hard segment of the polyesterurethane is from 20 to 36 percent.

26. The laminate of claim 25 wherein the polyesterurethane sheet is an interlayer between two sheets of glass and the sheet has an inherent viscosity of from 0.8 to 1.6 dl/g, as measured at a 0.5 percent concentration in N-methyl-2-pyrrolidone at 30° C.

* * * * *

UNITED STATES PATENT AND TRADEMARK OFFICE
CERTIFICATE OF CORRECTION

PATENT NO. : 4,041,208

DATED : August 9, 1977

INVENTOR(S) : Nelson V. Seeger and Andrew J. Kaman

It is certified that error appears in the above-identified patent and that said Letters Patent are hereby corrected as shown below:

IN THE CLAIMS:

Claim 7, Column 49, line 65 after "claim" insert --1--.

Claim 12, Column 50, line 17 should read:

"12. The laminate of claim 11 wherein the polyesterure-"

instead of:

"12. The laminate of claim 1 wherein the polyesterure-"

Signed and Sealed this

Twentieth Day of December 1977

[SEAL]

Attest:

RUTH C. MASON
*Attesting Officer*

LUTRELLE F. PARKER
*Acting Commissioner of Patents and Trademarks*